(12) United States Patent
Lacaux et al.

(10) Patent No.: US 12,316,152 B2
(45) Date of Patent: May 27, 2025

(54) ADAPTIVE BATTERY CHARGING SYSTEM AND METHOD

(71) Applicant: The Boeing Company, Chicago, IL (US)

(72) Inventors: Frederic Lacaux, Kirkland, WA (US); Eugene Solodovnik, Kenmore, WA (US); Vyacheslav Khozikov, Seattle, WA (US); John Anthony Trela, Seattle, WA (US); Kamiar Jahanbakhsh Karimi, Kirkland, WA (US); Shengyi Liu, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 635 days.

(21) Appl. No.: 17/651,359

(22) Filed: Feb. 16, 2022

(65) Prior Publication Data
US 2023/0261493 A1 Aug. 17, 2023

(51) Int. Cl.
*H02J 7/00* (2006.01)
*B60L 15/20* (2006.01)
(Continued)

(52) U.S. Cl.
CPC .......... *H02J 7/00712* (2020.01); *B60L 15/20* (2013.01); *B60L 50/60* (2019.02); *B60L 53/22* (2019.02); *B60L 53/60* (2019.02); *B60L 58/12* (2019.02); *B64C 27/68* (2013.01); *B64D 27/24* (2013.01); *B64D 31/00* (2013.01); *B64F 1/362* (2013.01); *H02J 7/0029* (2013.01); *H02J 7/0049* (2020.01); *H02M 7/797* (2013.01);

*H02P 27/06* (2013.01); *B60L 2200/10* (2013.01); *H02J 2207/20* (2020.01); *H02J 2310/44* (2020.01)

(58) Field of Classification Search
USPC ....................................................... 320/137
See application file for complete search history.

(56) References Cited

U.S. PATENT DOCUMENTS 10,771,001 B2 * 9/2020 Smolenaers ............ H02P 25/22
2020/0062138 A1 * 2/2020 Smolenaers ............ B60L 55/00
(Continued)

OTHER PUBLICATIONS

European Patent Office Extended Search Report, dated Jun. 27, 2023, regarding Application No. EP23155533.5, 7 pages.

*Primary Examiner* — Samuel Berhanu
(74) *Attorney, Agent, or Firm* — Yee & Associates, P.C.

(57) ABSTRACT

An aircraft adaptive battery charging system is provided. The adaptive battery charging system comprises: a battery system; a bidirectional converter, wherein the bidirectional converter is capable of an inverter mode and a rectifier mode; an alternating current (AC) motor; a number of controllable contactors that control electrical current between the battery system, bidirectional converter, AC motor, and a power source wherein the controllable contactors can be switched between a closed position to allow electrical current flow and an open position to prevent electrical current flow; a motor controller; a battery charging system controller configured to send control signals to the battery system, motor controller, and controllable contactors in response to system command signals; and a vehicle system controller that sends system command signals to the motor controller and battery charging system controller.

26 Claims, 17 Drawing Sheets

(51) Int. Cl.
  *B60L 50/60*  (2019.01)
  *B60L 53/22*  (2019.01)
  *B60L 53/60*  (2019.01)
  *B60L 58/12*  (2019.01)
  *B64C 27/68*  (2006.01)
  *B64D 27/24*  (2006.01)
  *B64D 31/00*  (2006.01)
  *B64F 1/36*   (2017.01)
  *H02M 7/797*  (2006.01)
  *H02P 27/06*  (2006.01)

(56) References Cited

U.S. PATENT DOCUMENTS

2020/0164755 A1* 5/2020 Smolenaers ............ B60L 53/53
2022/0340026 A1* 10/2022 Prasad .................... H02P 27/06

* cited by examiner

ADAPTIVE BATTERY CHARGING SYSTEM AND METHOD

BACKGROUND INFORMATION

1. Field

The present disclosure relates generally to a battery charging system, and more specifically, to a battery charging system that can charge a battery in a variety of modes from both DC and AC power sources.

2. Background

Batteries deployed in aircraft may be charged using direct current (DC) or alternating current (AC). Typically, a DC charging system and single-phase or three-phase AC charging systems require separate, dedicated converters and controllers.

Therefore, it would be desirable to have a method and apparatus that take into account at least some of the issues discussed above, as well as other possible issues.

SUMMARY

An illustrative embodiment provides an aircraft adaptive battery charging system that comprises: a battery system; a bidirectional converter, wherein the bidirectional converter is capable of an inverter mode and a rectifier mode; an alternating current (AC) motor; a number of controllable contactors that control electrical current between the battery system, bidirectional converter, AC motor, and a power source, wherein the controllable contactors can be switched between a closed position to allow electrical current flow and an open position to prevent electrical current flow; a motor controller; a battery charging system controller configured to send control signals to the battery system, motor controller, and controllable contactors in response to system command signals; and a vehicle system controller that sends system command signals to the motor controller and battery charging system controller.

Another illustrative embodiment provides a method for charging an aircraft battery. The method comprises receiving, by an adaptive battery charging system, a system command signal, wherein the adaptive battery charging system comprises: a battery system including the aircraft battery; a bidirectional converter; a battery charging system controller; and a vehicle system controller that sends the system command signal to the battery charging system controller. Responsive to the system command signal the vehicle system controller sends a signal to activate the battery charging system controller. The battery charging system controller sends a signal to close a first set of controllable contactors to allow electrical current between the battery system and an intermediate direct current (DC) bus, wherein the intermediate DC bus is connected to a DC power source. Responsive to the aircraft battery reaching full charge the battery charging system controller sends a signal to open the closed controllable contactors.

Another illustrative embodiment provides a method for charging an aircraft battery. The method comprises receiving, by an adaptive battery charging system, a system command signal, wherein the adaptive battery charging system comprises: a battery system including the aircraft battery; a bidirectional converter; a motor controller; a battery charging system controller; and a vehicle system controller that sends the system command signal to the motor controller and the battery charging system controller. Responsive to the system command signal the vehicle system controller sends a signal to activate the battery charging system controller and motor controller. The battery charging system controller: sends a signal to close a first set of controllable contactors to allow electrical current between the battery system and the bidirectional converter; and sends a signal to close a second set of controllable contactors to allow electrical current between the bidirectional converter and an intermediate direct current (DC) bus, wherein the intermediate DC bus is connected to a DC power source. Responsive to the aircraft battery reaching full charge the battery charging system controller sends a signal to open the closed controllable contactors.

Another illustrative embodiment provides a method for charging an aircraft battery. The method comprises receiving, by an adaptive battery charging system, a system command signal, wherein the adaptive battery charging system comprises: a battery system including the aircraft battery; a bidirectional converter; an alternating current (AC) motor; a motor controller; a battery charging system controller; and a vehicle system controller that sends the system command signal to the motor controller and the battery charging system controller. Responsive to the system command signal the vehicle system controller sends a signal to activate the battery charging system controller and motor controller. The battery charging system controller: sends a signal to close a first set of controllable contactors to allow electrical current between the battery system and the bidirectional converter; sends a signal to close a second set of controllable contactors to allow electrical current between the bidirectional converter and the AC motor; and sends a signal to close a third set of controllable contactors to allow electrical current between an intermediate direct current (DC) bus and both the bidirectional converter and AC motor, wherein the intermediate DC bus is connected to a DC power source. Responsive to the aircraft battery reaching full charge the battery charging system controller sends a signal to open the closed controllable contactors.

Another illustrative embodiment provides a method for charging an aircraft battery. The method comprises receiving, by an adaptive battery charging system, a system command signal, wherein the adaptive battery charging system comprises: a battery system including the aircraft battery, a bidirectional converter; a motor controller; a battery charging system controller; and a vehicle system controller that sends the system command signal to the motor controller and the battery charging system controller. Responsive to the system command signal the vehicle system controller sends a signal to activate the battery charging system controller and motor controller. The battery charging system controller: sends a signal to close a first set of controllable contactors to allow electrical current between the battery system and the bidirectional converter; and sends a signal to close a second set of controllable contactors to allow electrical current between the bidirectional converter and an alternating current (AC) power source. Responsive to the aircraft battery reaching full charge the battery charging system controller sends a signal to open the closed controllable contactors.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that typically a direct current (DC) charging system and single-phase or three-phase alternating current (AC) charging systems require separate, dedicated converters and controllers.

The illustrative embodiments provide an adaptive battery charging system that is capable of using ground or aircraft power sources, either DC or AC in either three phases or a single phase and either low or high voltage, thereby providing ten different possible battery charging modes. The illustrative embodiments utilize the onboard motor drive system as part of the integrated battery charging system without the need for a separate converter.

Multiple charging operation modes enable the aircraft battery to adapt to various voltage levels of ground charging stations and aircraft power system conditions without using additional separate charging equipment.

Figure 1:
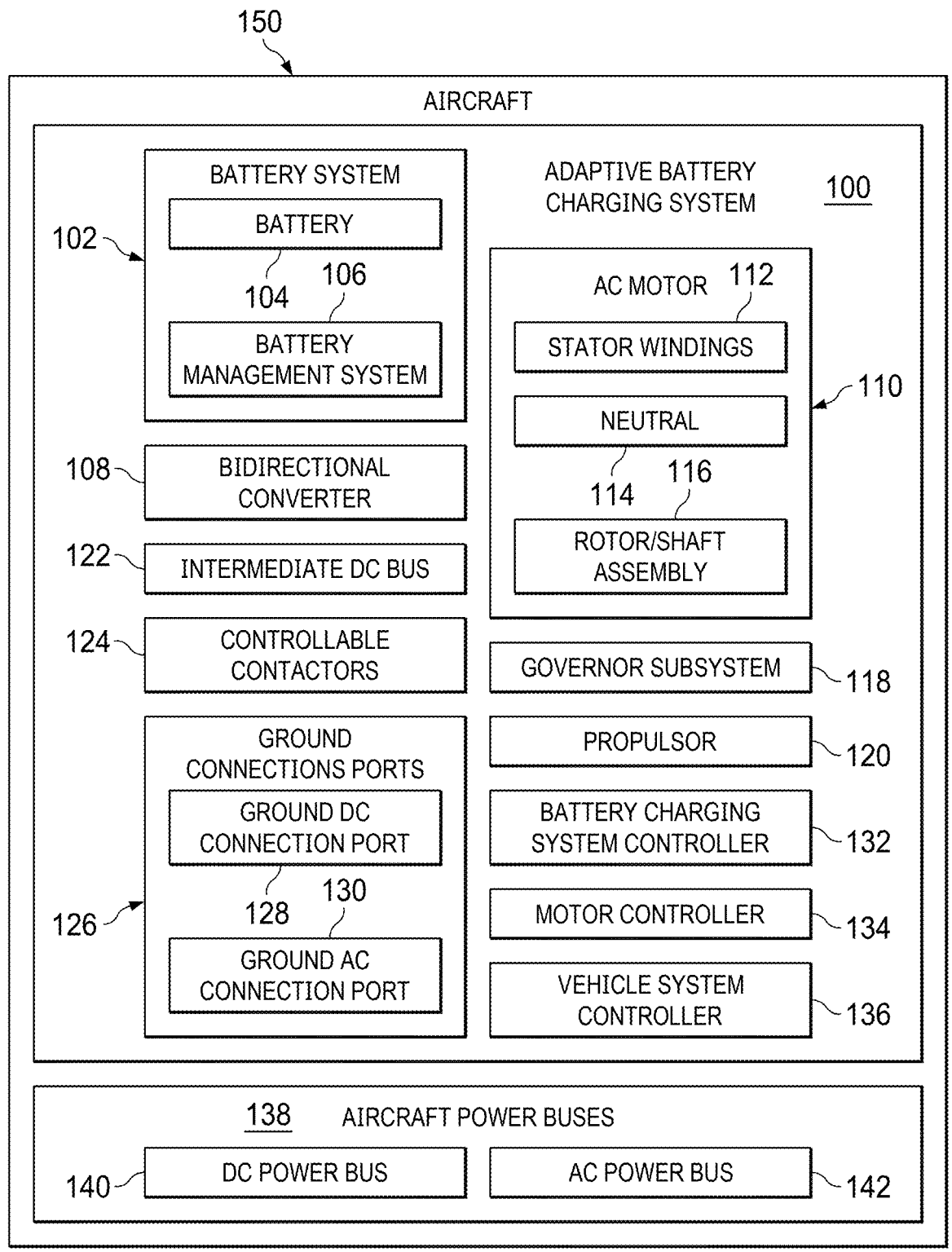
FIG. 1 depicts a block diagram illustrating an adaptive battery charging system in accordance with an illustrative embodiment.

Turning now to FIG. 1, a block diagram illustrating an adaptive battery charging system is depicted in accordance with an illustrative embodiment. Adaptive battery charging system 100 comprises battery system 102, bidirectional converter 108, and AC motor 110.

Battery system 102 comprise battery 104 and battery management system 106.

AC motor 110 comprises stator windings 112, neutral 114, and a rotor/shaft assembly 116. Propulsor 120 is connected to rotor/shaft assembly 116 and is controlled by governor subsystem 118.

Adaptive battery charging system 100 comprises intermediate DC bus 122 and controllable contactors 124, which are switchable between open and closed positions to control the flow of electric current between components of adaptive battery charging system 100.

Battery charging system controller 132 and motor controller 134 provide control signals to the other components according to system command signals from vehicle system controller 136.

Adaptive battery charging system 100 comprises ground connection ports 126, which include a DC connection port 128 and an AC connection port 130.

Adaptive battery charging system 100 is located in aircraft 150. Aircraft 150 includes power buses 138, which include a DC power bus 140 and AC power bus 142.

Figure 2:
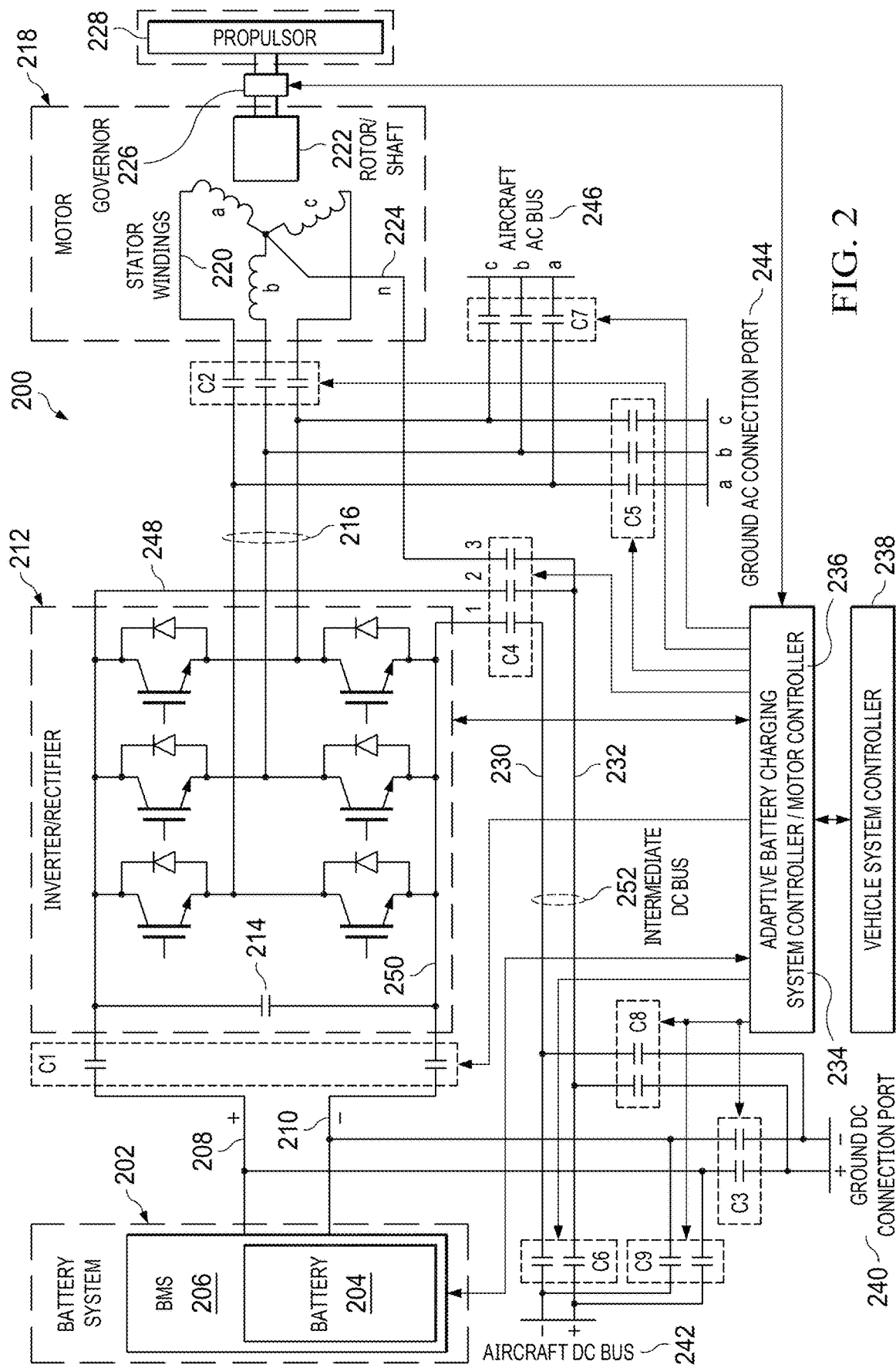
FIG. 2 depicts a circuit diagram of an adaptive battery charging system in accordance with an illustrative embodiment.

FIG. 2 depicts a circuit diagram of an adaptive battery charging system in accordance with an illustrative embodiment. Adaptive battery charging system 200 might be an example implementation of adaptive battery charging system 100 in FIG. 1.

Adaptive battery charging system 200 comprises a battery system 202 that includes a battery 204 and a battery management system (BMS) 206. Battery system 202 has a positive terminal 208 and negative terminal 210 to delivery electrical power to the bus or receive electrical power to charge the battery 204.

BMS 206 performs several functions. One function is to monitor battery status including the state of charge, state of health, temperature, pressure, voltage, and current. BMS 206 also sends monitoring information to the adaptive battery charging system controller 234. BMS 206 also performs a constant-current (CC) and constant-voltage (CV) battery charging control commanded by the adaptive battery charging system 200.

Adaptive battery charging system 200 also comprises a three-phase bidirectional converter 212 capable of an inverter mode, a rectification mode, and boost rectification mode. In the inverter mode, electrical power flows from a DC source to three-phase AC motor or a 3-phase AC bus. In rectification mode electrical power flows from a single phase or three-phase AC source to a DC source or a DC bus. In boost rectification mode electrical power flows from an AC source to a DC source or a DC bus at a higher voltage. In the illustrated example, bidirectional converter 212 comprises a two-level inverter with a DC filter capacitor 214. However, other multi-level inverter topologies may be used with the illustrative embodiments, e.g., a three-level or higher-level inverter.

Adaptive battery charging system 200 also comprises a three-phase AC motor 218. AC motor 218 comprises a three-phase stator winding 220 connected to a three-phase AC bus 216 and a neutral 224 connected to one of controllable contactors C4 for specific battery charging purposes. In this example, AC motor 218 is a four-wire AC motor. AC motor 218 also comprises a rotor/shaft assembly 222 with a shaft that outputs mechanical power. A propulsor 228 is mounted on the motor shaft of rotor/shaft assembly 222 to receive the mechanical power. A governor subsystem 226 senses shaft speed and propulsor blade pitch angle and controls the pitch angle according to commands from the motor controller 236.

Adaptive battery charging system 200 includes a battery charging system controller 234 co-located with a motor controller 236. The battery charging system controller 234 receives system command signals (vehicle operation mode signals) from vehicle system controller 238. Battery charging system controller 234 also receives battery status information (including voltage and current) from BMS 206 as well as motor controller mode (inversion or rectification) and switching status from motor controller 236. Battery charging system controller 234 sends control signals to BMS 206, motor controller 236, and controllable contactors C1-C9 according to a control algorithm and system command signals. Battery charging system controller 234 also sends system status information to vehicle system controller 238.

In the case of battery charging under an integrated or boost mode (explained below), motor controller 236 receives command signals from battery charging system controller 234 as well as battery status information (including voltage and current) from BMS 206. Motor controller 236 also receives DC bus side voltage and current signals and provides switching control to the bidirectional converter 212 for either the integrated battery charging mode or boot battery charging mode according to a charge control algorithm.

In the case of a motor drive mode, motor controller 236 receives system command signals from the vehicle system controller 238 as well as inverter AC side voltage and current signals, DC side voltage and current signals, and a motor speed signal. Motor controller 236 provides switching control of the bidirectional converter 212 to accomplish motor speed or torque control according to a control algorithm.

Vehicle system controller 238 sending motor drive or charge control system command signals to the battery charging system controller 234 and motor controller 236 and thereby provides an interface with the system command.

Controllable contactors C1-C7 control electrical current between the components of the adaptive battery charging system 200 according to command signals from the battery charging system controller 234. The controllable contactors C1-C7 can be switched between a closed position that allows electrical current flow and an open position that prevents electrical current flow. In the illustrative embodiments, the controllable contactors C1-C7 may be open by default unless closed by command signals from the battery charging system controller 234 or motor controller 236.

Controllable contactors C1 connect the positive 208 and negative 210 terminals to corresponding rails 248, 250 of the inverter DC input of bidirectional converter 212.

Controllable contactors C2 connect the three-phase AC bus 216 of the bidirectional converter 212 to the three-phase input of AC motor 218.

Controllable contactors C3 connect the positive terminal 208 and negative 210 terminal to corresponding positive line 232 and negative line 230 of an intermediate DC bus 252.

Controllable contactors C4 connect the bidirectional converter 212 and the AC motor 218 to the intermediate DC bus 252. Specifically, controllable contactor C4-1 connects the negative DC rail 250 of the bidirectional converter 212 to the negative line 230 of intermediate bus 252. Controllable contactor C4-2 connects the positive DC rail 248 of the bidirectional converter 212 to the positive line 232 of intermediate bus 252. Controllable contactor C4-3 connects the neutral point 224 of the AC motor 218 to the positive line 232 of intermediate bus 252.

Controllable contactors C5 connect the three-phase AC bus 216 of the bidirectional converter 212 to corresponding three-phase terminals of ground AC connection port 244. Selected two-phase connections (i.e., a and b, b and c, or c and a) are used for a single-phase (phase and non-grounded neutral) ground AC charging mode (explained below).

Controllable contactors C6 connect the intermediate DC bus 252 to the aircraft DC power bus 242. The aircraft DC power bus 242 connects to the battery through controllable contactors C9.

Controllable contactors C7 connects the three-phase AC bus 216 of the bidirectional converter 212 to corresponding terminals of three-phase aircraft AC power bus 246. Similar to controllable contactors C6, selected two-phase connections (i.e., a and b, b and c, or c and a) are used for a single-phase aircraft AC charging mode.

Figure 3:
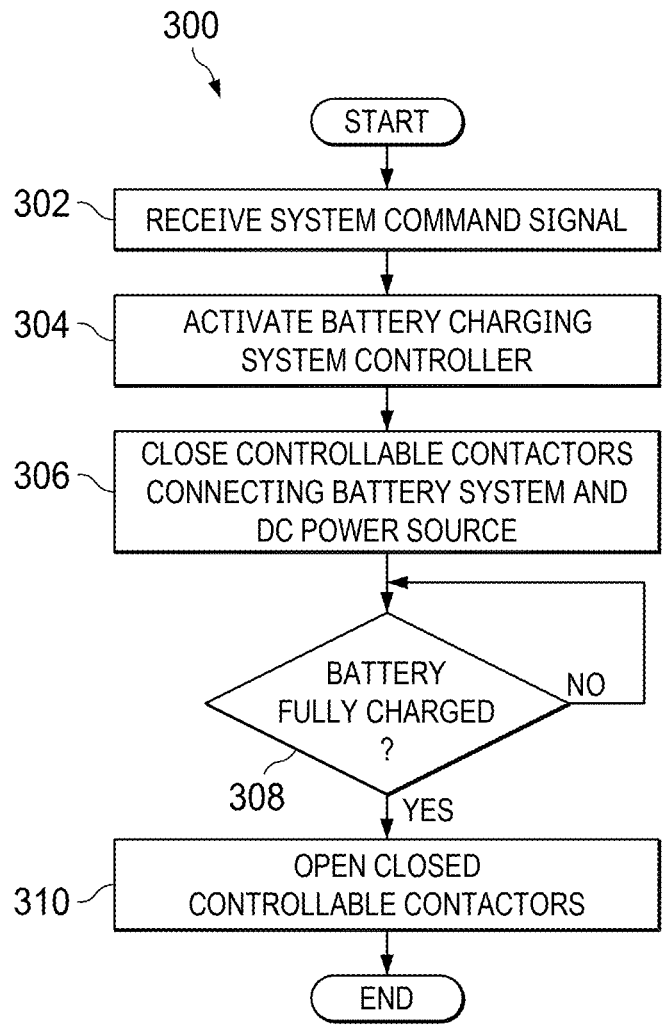
FIG. 3 depicts a flowchart illustrating a process for isolated battery charging from a DC power source in accordance with an illustrative embodiment.

FIG. 3 depicts a flowchart illustrating a process for isolated battery charging from a DC power source in accordance with an illustrative embodiment. Process 300 may be implemented in adaptive battery charging system 100 in FIG. 1 and adaptive battery charging system 200 in FIG. 2.

Process 300 begins with the adaptive battery charging system receiving a system command signal (operation 302). Responsive to the system command signal, the vehicle system controller sends a signal to activate the battery charging system controller, leaving the motor controller inactive (operation 304).

The battery charging system controller sends a signal to close a first set of controllable contactors to allow electrical current between the battery system and the intermediate DC bus, wherein the intermediate DC bus is connected to a DC power source (operation 306). The DC power source may be a ground DC power source or an aircraft DC power bus.

The battery charging system controller continually monitors the battery charge level (operation 308). Responsive to the aircraft battery reaching full charge the battery charging system controller sends a signal to open the closed controllable contactors to disconnect the battery system from the DC power source (operation 310). Process 300 then ends.

Figure 4:
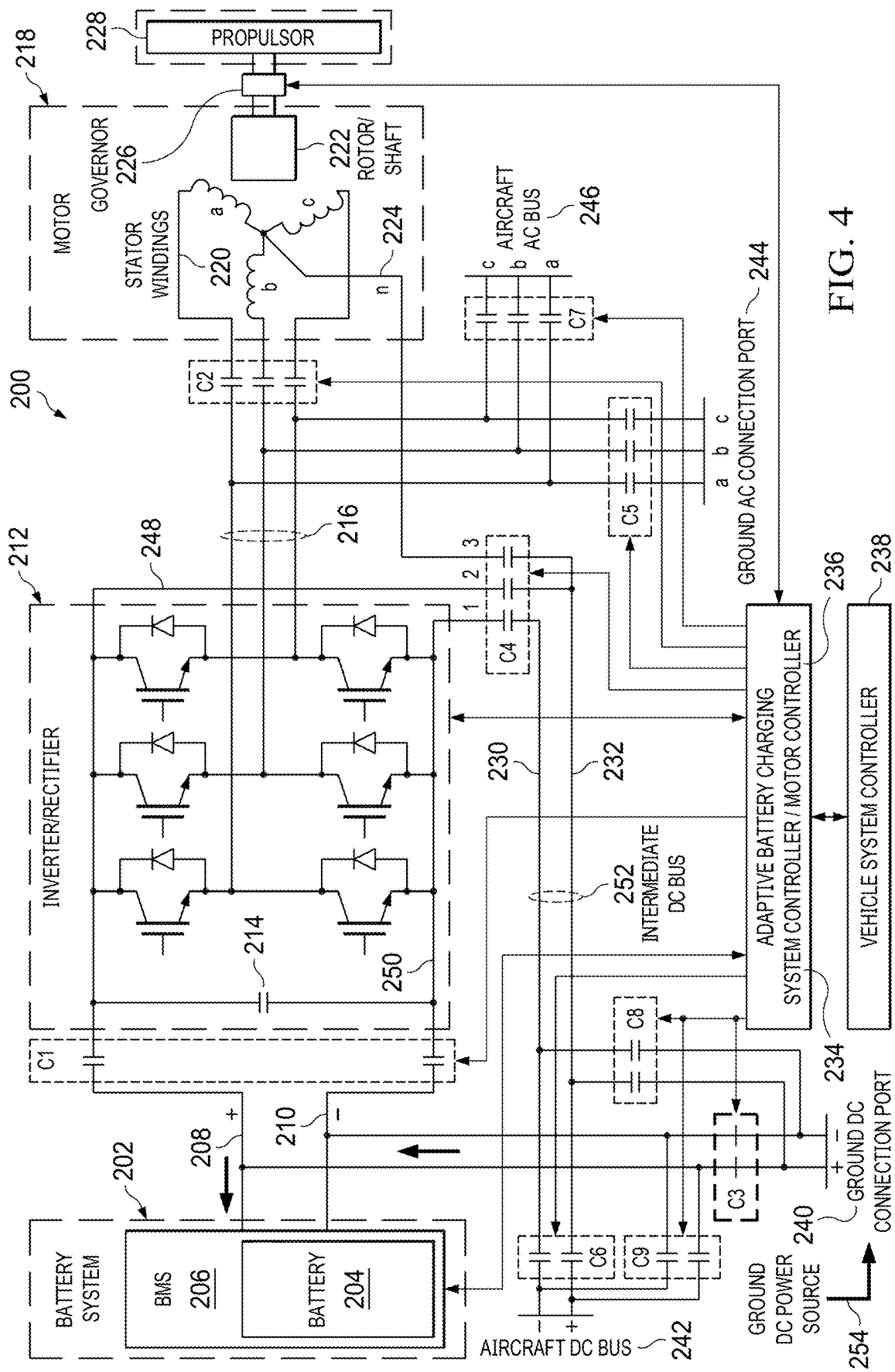
FIG. 4 depicts a circuit diagram illustrating isolated ground DC charging of a battery in accordance with an illustrative embodiment.

FIG. 4 depicts a circuit diagram illustrating isolated ground DC charging of a battery in accordance with an illustrative embodiment. FIG. 4 illustrates an example of applying process 300 in FIG. 3 to adaptive battery charging system 200 in FIG. 2.

The vehicle system controller 238 sends a command signal to the battery charging system controller 234 and motor controller 236. The battery charging system controller 234 is activated, and the motor controller 236 is deactivated.

Controllable contactors C3 are closed, connecting the positive terminal 208 and negative terminal 210 to the corresponding positive and negative ports of the ground DC connection port 240. Ground DC power source 254 is applied to the ground DC source connection port 240, which is connected to the intermediate power bus 252.

Controllable connectors C1, C2, and C4-C9 are left open, isolating the bidirectional converter 212, AC motor 218, and propulsor 228 (motor drive chain) from the charging process.

The battery 204 is controlled by the battery charging system controller 234 and BMS 206 to execute a constant-current then a constant-voltage charging algorithm or other algorithm depending on the specific battery. BMS 206 monitors battery status and sends battery voltage and current signals to the battery charging system controller 234, which in turn controls the BMS 206 for safe, fast, and optimized charging.

When the battery 204 is fully charged, the battery charging system controller 234 send a control signal to open controllable contactors C3, thereby disconnecting the battery system 202 from the ground DC power source 254. The vehicle system controller 238 may interrupt and override the charging process due to an unexpected emergency situation.

Isolated ground DC charging mode is suited to a situation wherein the ground power source has a voltage that is equivalent to the battery designed voltage. FIG. 4 illustrates circuitry for isolated ground DC charging mode.

Figure 5:
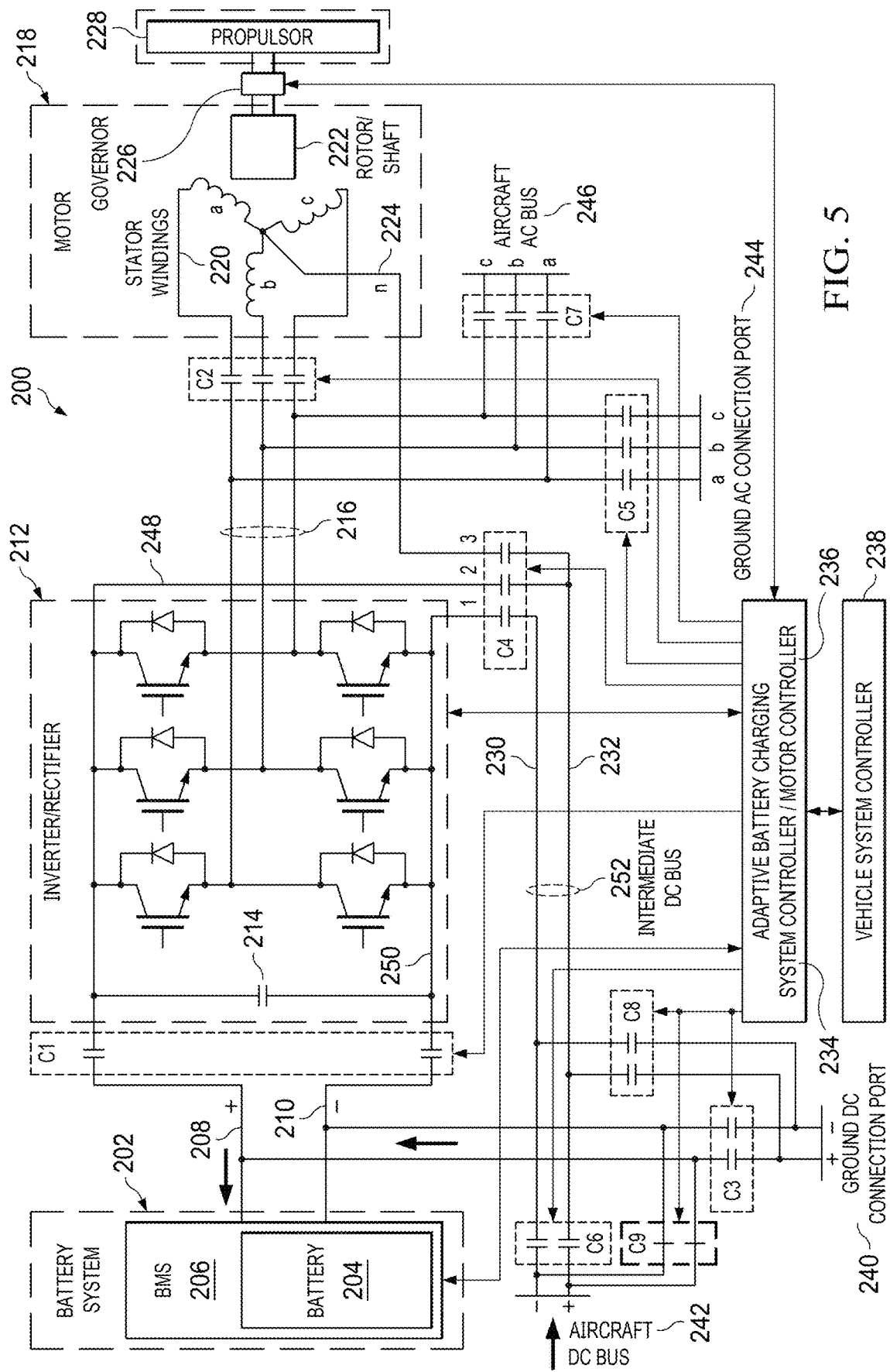
FIG. 5 depicts a circuit diagram illustrating isolated aircraft DC charging of a battery in accordance with an illustrative embodiment.

FIG. 5 depicts a circuit diagram illustrating isolated aircraft DC charging of a battery in accordance with an illustrative embodiment. FIG. 5 illustrates an example of applying process 300 in FIG. 3 to adaptive battery charging system 200 in FIG. 2 by closing controllable contractor C9.

The vehicle system controller 238 sends a command signal to the battery charging system controller 234 and motor controller 236. The battery charging system controller 234 is activated, and the motor controller 236 is deactivated.

Controllable contactors C9 are closed, connecting the positive terminal 208 and negative terminal 210 to the corresponding positive and negative ports of the aircraft DC bus 242. In this example, intermediate power bus 252 is an intermediate DC power bus.

Controllable connectors C1, C2, and C4-C8, are left open, isolating the bidirectional converter 212, AC motor 218, and propulsor 228 (motor drive chain) from the charging process.

The battery 204 is controlled by the battery charging system controller 234 and BMS 206 to execute a constant-current then a constant-voltage charging algorithm or other algorithm depending on the specific battery. BMS 206 monitors battery status and sends battery voltage and current signals to the battery charging system controller 234, which in turn controls the BMS 206 for safe, fast, and optimized charging.

When the battery 204 is fully charged, the battery charging system controller 234 send a control signal to open controllable contactors C3 and C6, thereby disconnecting the battery system 202 from the aircraft DC power bus 242. The vehicle system controller 238 may interrupt and override the charging process due to an unexpected emergency situation.

Isolated aircraft DC charging mode is suited to a situation wherein another DC source onboard has additional energy and the aircraft bus voltage level is equivalent to the battery designed voltage while the aircraft is airborne.

Figure 6:
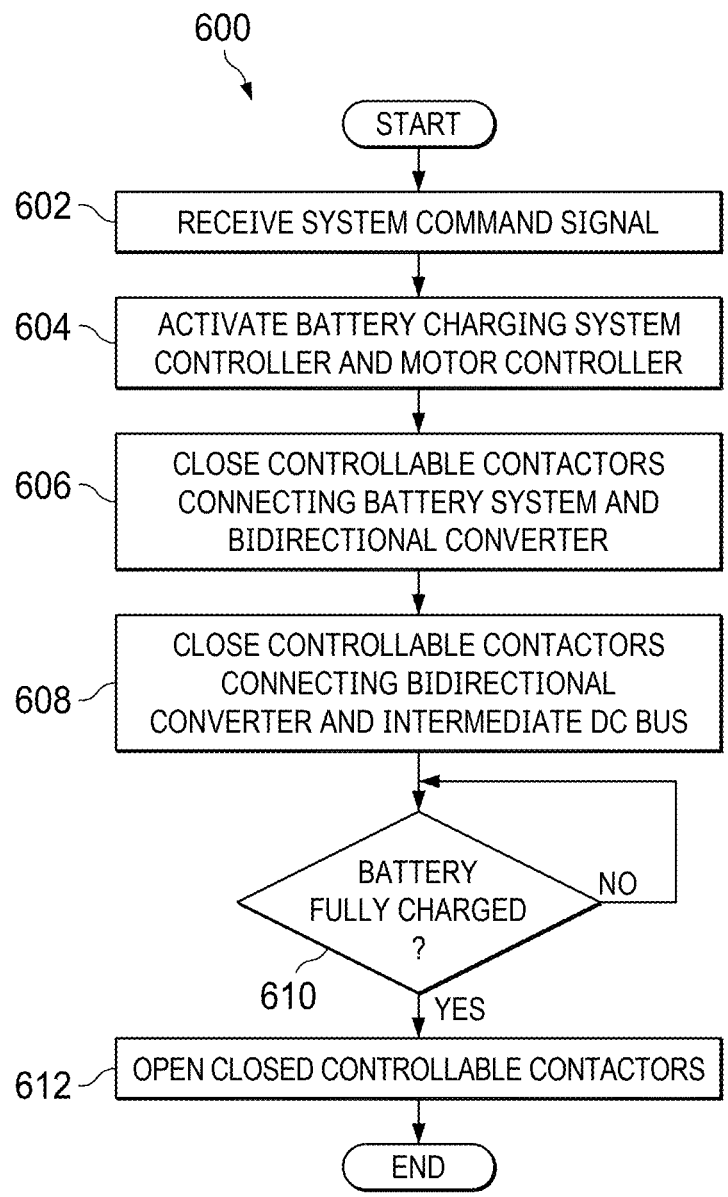
FIG. 6 depicts a flowchart illustrating a process for integrated battery charging from a DC power source in accordance with an illustrative embodiment.

FIG. 6 depicts a flowchart illustrating a process for integrated battery charging from a DC power source in accordance with an illustrative embodiment. Process 600 may be implemented in adaptive battery charging system 100 in FIG. 1 and adaptive battery charging system 200 in FIG. 2.

Process 600 begins with the adaptive battery charging system receiving a system command signal (operation 602). Responsive to the system command signal, the vehicle system controller sends a signal to activate the battery charging system controller and motor controller (operation 604).

The battery charging system controller sends a signal to close a first set of controllable contactors to allow electrical current between the battery system and the bidirectional converter (operation 606).

The battery charging system controller also sends a signal to close a second set of controllable contactors to allow electrical current between the bidirectional converter and the intermediate DC bus, wherein the intermediate DC bus is connected to a DC power source (operation 608). The DC power source may be a ground DC power source or an aircraft DC power bus.

The battery charging system controller continually monitors the battery charge level (operation 610). Responsive to the aircraft battery reaching full charge the battery charging system controller sends a signal to open the closed controllable contactors to disconnect the battery system from the DC power source (operation 612). Process 600 then ends.

Figure 7:
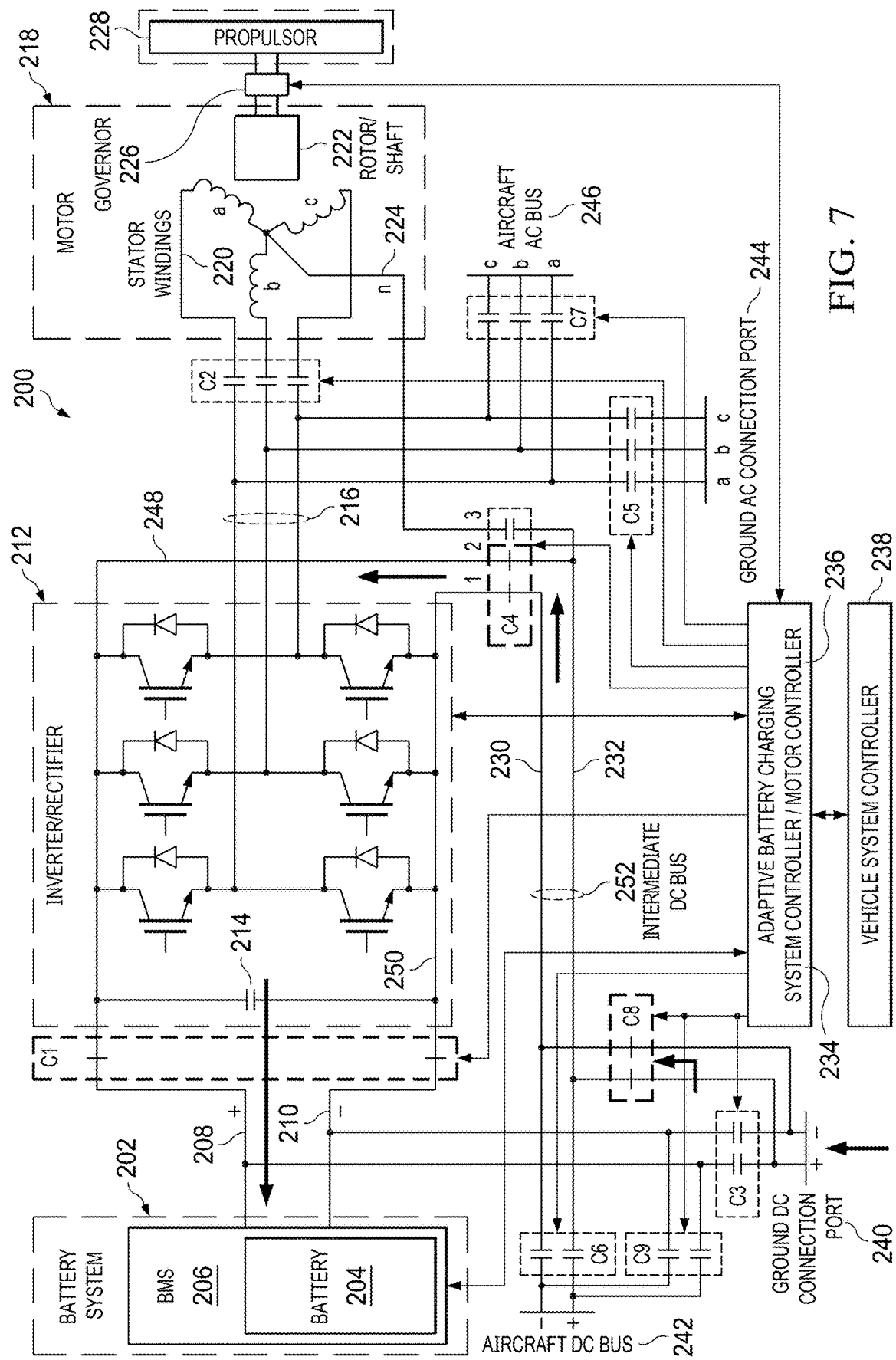
FIG. 7 depicts a circuit diagram illustrating integrated ground DC charging of a battery in accordance with an illustrative embodiment.

FIG. 7 depicts a circuit diagram illustrating integrated ground DC charging of a battery in accordance with an illustrative embodiment. FIG. 7 illustrates an example of applying process 600 in FIG. 6 to adaptive battery charging system 200 in FIG. 2.

The vehicle system controller 238 sends a command signal to the battery charging system controller 234 and motor controller 236. The battery charging system controller 234 and motor controller 236 are activated (integrated).

Controllable contactors C1, C4-1 and C4-2, and C8 are closed. Controllable contactors C1 connect the positive terminal 208 and negative terminal 210 to corresponding rails 248, 250 of bidirectional converter 212 on the DC input side. Controllable contactors C4-1 and C4-2 connect the positive rail 248 and negative rail 250 of bidirectional converter 212 to the corresponding positive line 232 and negative line 230 of intermediate DC bus 252. Ground DC power source 254 is applied to the ground DC source connection port 240, which is connected to the intermediate power bus 252.

Controllable connectors C2, C3, C4-3, and C5-C7, and C9 are left open, isolating the AC motor 218 and propulsor 228 from the charging process.

The battery 204 is controlled by the battery charging system controller 234 and BMS 206 to execute a constant-current then a constant-voltage charging algorithm or other algorithm depending on the specific battery. Power flows from the ground DC power source 254 via the intermediate DC bus 252 to the bidirectional converter 212 (working in inverter mode) and then to the battery 204 in an integrated fashion. BMS 206 monitors battery status and sends battery voltage and current signals to the battery charging system controller 234, which in turn controls the BMS 206 for safe, fast, and optimized charging.

When the battery 204 is fully charged, the battery charging system controller 234 send a control signal to open controllable contactors C1, C4-1, and C4-2, thereby disconnecting the battery system 202 from the ground DC power source 254. The vehicle system controller 238 may interrupt and override the charging process due to an unexpected emergency situation.

Integrated ground DC charging mode is suited to a situation wherein the ground power source has a voltage that is equivalent to the battery designed voltage. In this mode, the bidirectional converter 212 may be used for interrupting the charging process to protect the battery in case of an unexpected emergency.

Figure 8:
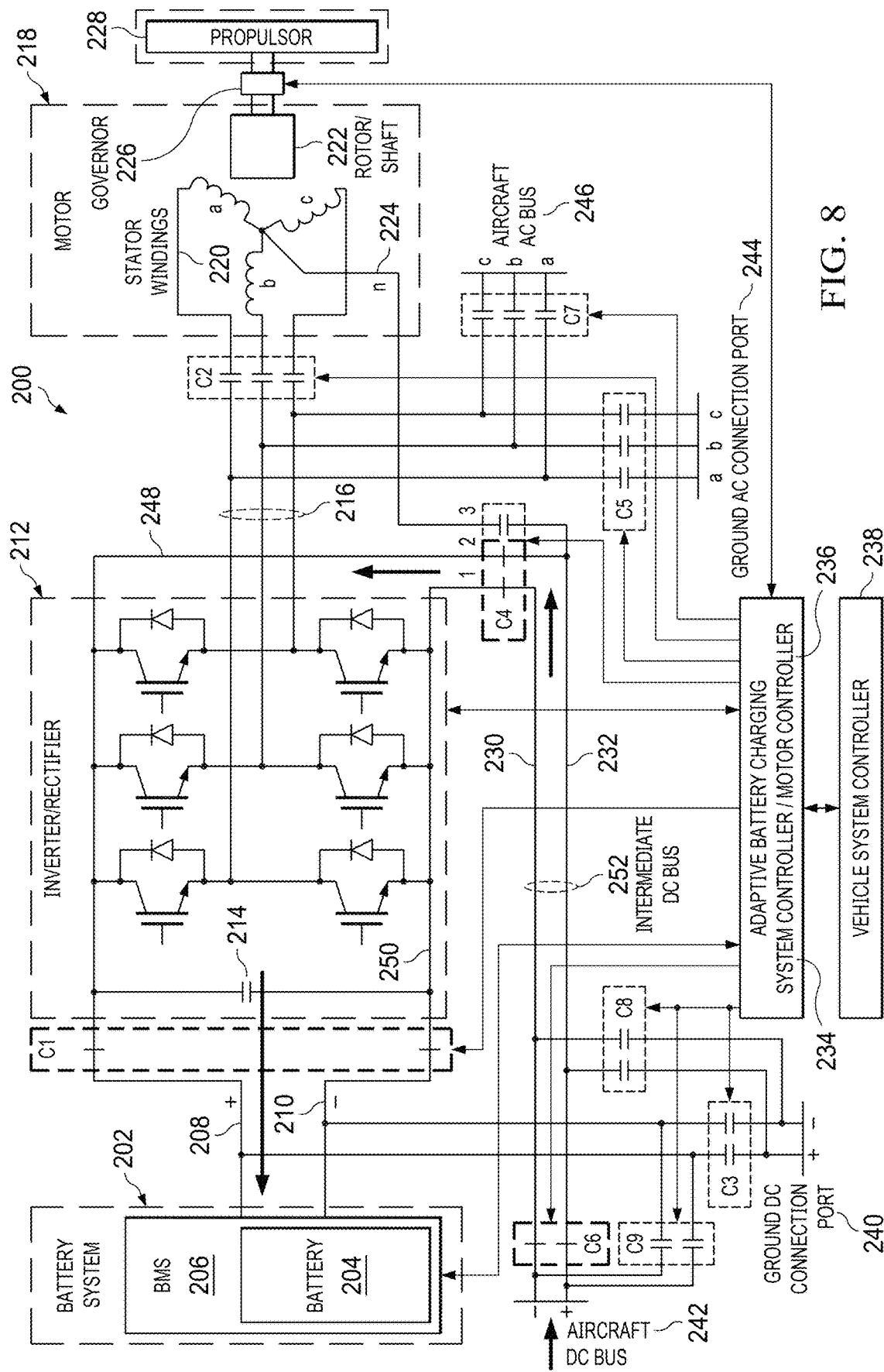
FIG. 8 depicts a circuit diagram illustrating integrated aircraft DC charging of a battery in accordance with an illustrative embodiment.

FIG. 8 depicts a circuit diagram illustrating integrated aircraft DC charging of a battery in accordance with an illustrative embodiment. FIG. 8 illustrates an example of applying process 600 in FIG. 6 to adaptive battery charging system 200 in FIG. 2.

The vehicle system controller 238 sends a command signal to the battery charging system controller 234 and motor controller 236. The battery charging system controller 234 and motor controller 236 are activated (integrated).

Controllable contactors C1, C4-1, C4-2, and C6 are closed. Controllable contactor C1 connect the positive terminal 208 and negative terminal 210 to corresponding rails 248, 250 of bidirectional converter 212 on the DC input side. Controllable contactors C4-1 and C4-2 connect the positive rail 248 and negative rail 250 of bidirectional converter 212 to the corresponding positive line 232 and negative line 230 of intermediate DC bus 252. Controllable contactors C6 connect aircraft DC power bus 242 to intermediate DC bus 252.

Controllable connectors C2, C3, C4-3, C5, and C7-C9 are left open, isolating the AC motor 218 and propulsor 228 from the charging process.

The battery 204 is controlled by the battery charging system controller 234 and BMS 206 to execute a constant-current then a constant-voltage charging algorithm or other algorithm depending on the specific battery. Power flows from the aircraft DC power bus 242 via the intermediate DC bus 252 to the bidirectional converter 212 (working in inverter mode) and then to the battery 204 in an integrated fashion. BMS 206 monitors battery status and sends battery voltage and current signals to the battery charging system controller 234, which in turn controls the BMS 206 for safe, fast, and optimized charging.

When the battery 204 is fully charged, the battery charging system controller 234 send a control signal to open controllable contactors C1, C4-1, C4-2, and C6 thereby disconnecting the battery system 202 from the aircraft DC power bus 242. The vehicle system controller 238 may interrupt and override the charging process due to an unexpected emergency situation.

Integrated aircraft DC charging mode is suited to a situation wherein another DC source onboard has additional energy and the aircraft bus voltage level is equivalent to the battery designed voltage while the aircraft is airborne. In this mode, the bidirectional converter 212 may be used for interrupting the charging process to protect the battery in case of an unexpected emergency.

Figure 9:
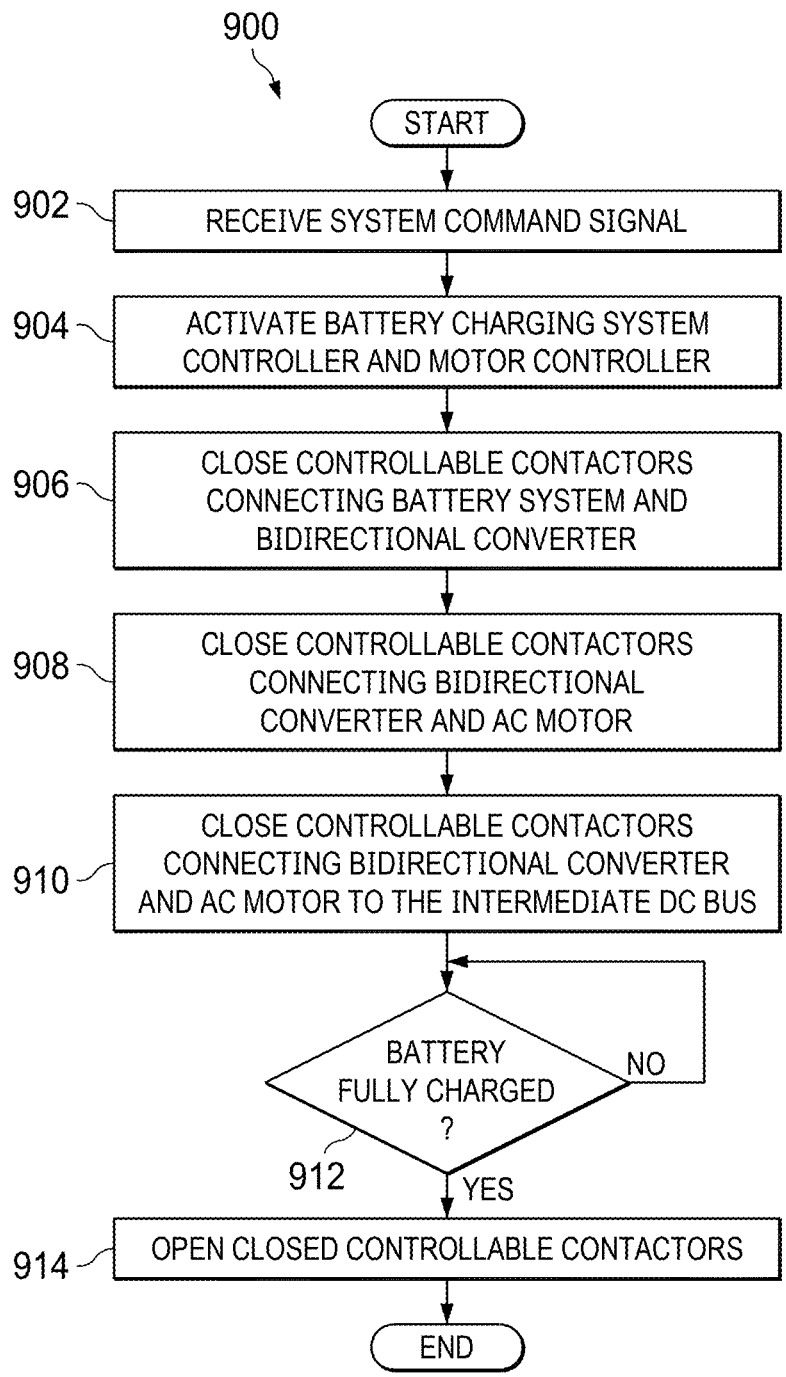
FIG. 9 depicts a flowchart illustrating a process for boost battery charging from a DC power source in accordance with an illustrative embodiment.

FIG. 9 depicts a flowchart illustrating a process for boost battery charging from a DC power source in accordance with an illustrative embodiment. Process 900 may be implemented in adaptive battery charging system 100 in FIG. 1 and adaptive battery charging system 200 in FIG. 2.

Process 900 begins with the adaptive battery charging system receiving a system command signal (operation 902). Responsive to the system command signal, the vehicle system controller sends a signal to activate the battery charging system controller and motor controller (operation 904).

The battery charging system controller sends a signal to close a first set of controllable contactors to allow electrical current between the battery system and the bidirectional converter (operation 906).

The battery charging system controller also sends a signal to close a second set of controllable contactors to allow electrical current between the bidirectional converter and the AC motor (operation 908).

The battery charging system controller also sends a signal to close a third set of controllable contactors to allow electrical current between the intermediate DC bus and both the bidirectional converter and AC motor (operation 910). The intermediate DC bus is connected to a DC power source which may be a ground DC power source or an aircraft DC power bus.

The battery charging system controller continually monitors the battery charge level (operation 912). Responsive to the aircraft battery reaching full charge the battery charging system controller sends a signal to open the closed controllable contactors to disconnect the battery system from the DC power source (operation 914). Process 900 then ends.

Figure 10:
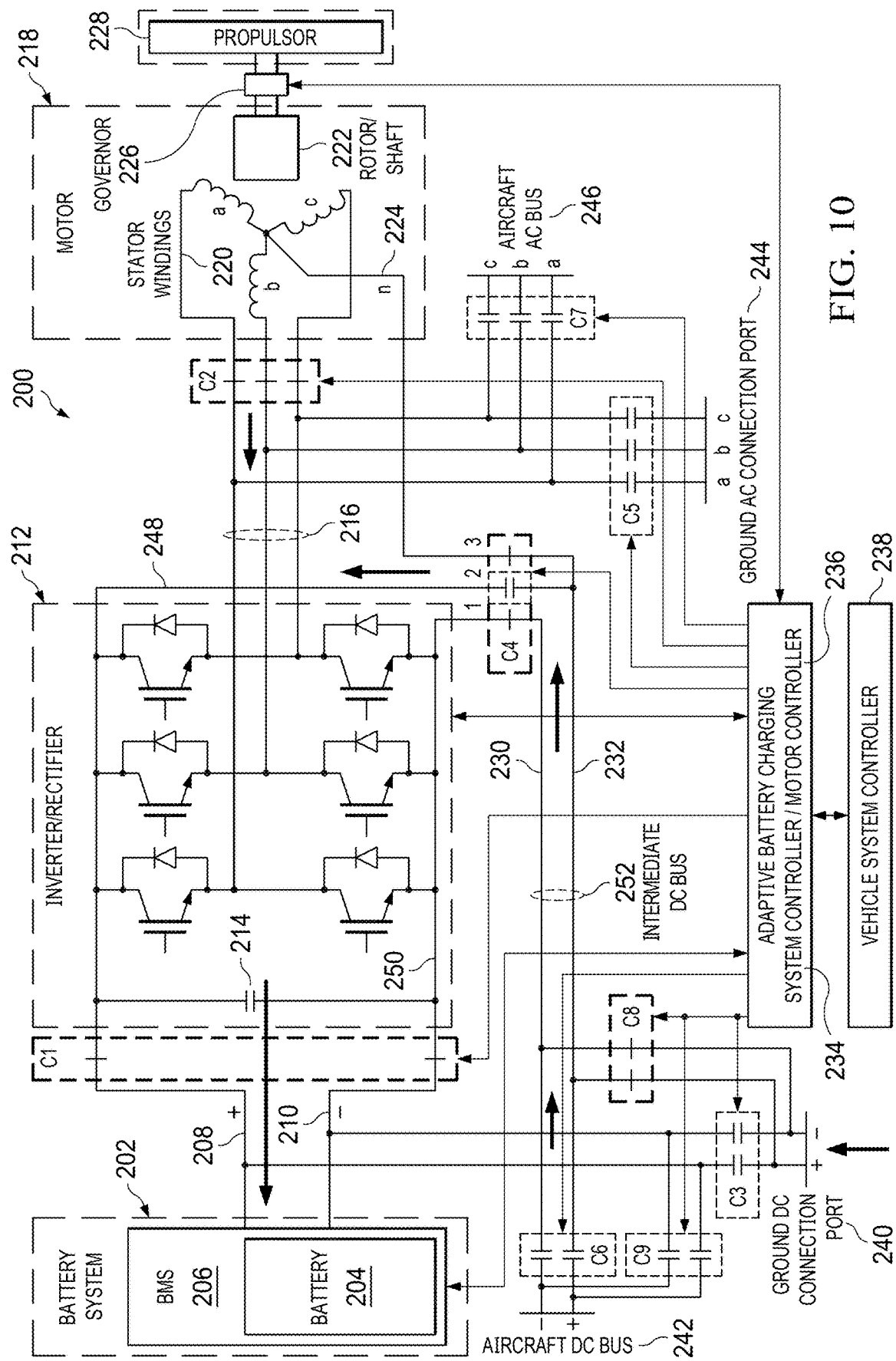
FIG. 10 depicts a circuit diagram illustrating ground DC boost charging of a battery in accordance with an illustrative embodiment.

FIG. 10 depicts a circuit diagram illustrating ground DC boost charging of a battery in accordance with an illustrative embodiment. FIG. 10 illustrates an example of applying process 900 in FIG. 9 to adaptive battery charging system 200 in FIG. 2.

The vehicle system controller 238 sends a command signal to the battery charging system controller 234 and motor controller 236. The battery charging system controller 234 and motor controller 236 are activated.

Controllable contactors C1, C8, C4-1 and C4-3 are closed. Controllable contactor C1 connect the positive terminal 208 and negative terminal 210 to corresponding rails 248, 250 of bidirectional converter 212 on the DC input side. Controllable contactors C2 connect three-phase AC bus 216 to the three-phase input of AC motor 218. Controllable contactor C4-1 connects the negative rail 250 and of bidirectional converter 212 to the corresponding negative line 230 of intermediate DC bus 252. Controllable contactor C4-3 connects the AC motor neutral point 224 to the positive line 232 of intermediate DC bus 252. Ground DC power source 254 is applied to the ground DC source connection port 240, which is connected to the intermediate power bus 252.

Controllable connectors C3, C4-2, and C5-C7, and C9 are left open.

The battery 204 is controlled by the battery charging system controller 234 and BMS 206 to execute a constant-current then a constant-voltage charging algorithm or other algorithm depending on the specific battery. Power flows from the ground DC power source 254 via the intermediate DC bus 252 to the neutral point 224 of the AC motor 218 and splits equally into three-phase winding DC currents. Stator windings 220 and the three-phase bidirectional converter 212 (working in inverter mode) form part of the charging system in an integrated fashion. The inductance the stator windings 220 is connected to the corresponding three-phase AC bus 216 of the bidirectional converter 212, forming a single-phase boost converter. By controlling the switches of the bidirectional converter 212, the voltage at the DC side of the converter is higher than the DC voltage of the ground DC power source 254, thereby achieving a boost charging effect.

BMS 206 monitors battery status and sends battery voltage and current signals to the battery charging system controller 234, which in turn controls the BMS 206 for safe, fast, and optimized charging.

When the battery 204 is fully charged, the battery charging system controller 234 send a control signal to open controllable contactors C1, C2, C4-1, and C4-3, thereby disconnecting the battery system 202 from the ground DC power source 254. The vehicle system controller 238 may interrupt and override the charging process due to an unexpected emergency situation.

Ground DC boost charging mode is suited to a situation wherein the ground power source has a voltage that is lower than the battery designed voltage. In this mode, the bidirectional converter 212 may be used for interrupting the charging process to protect the battery in case of an unexpected emergency.

Figure 11:
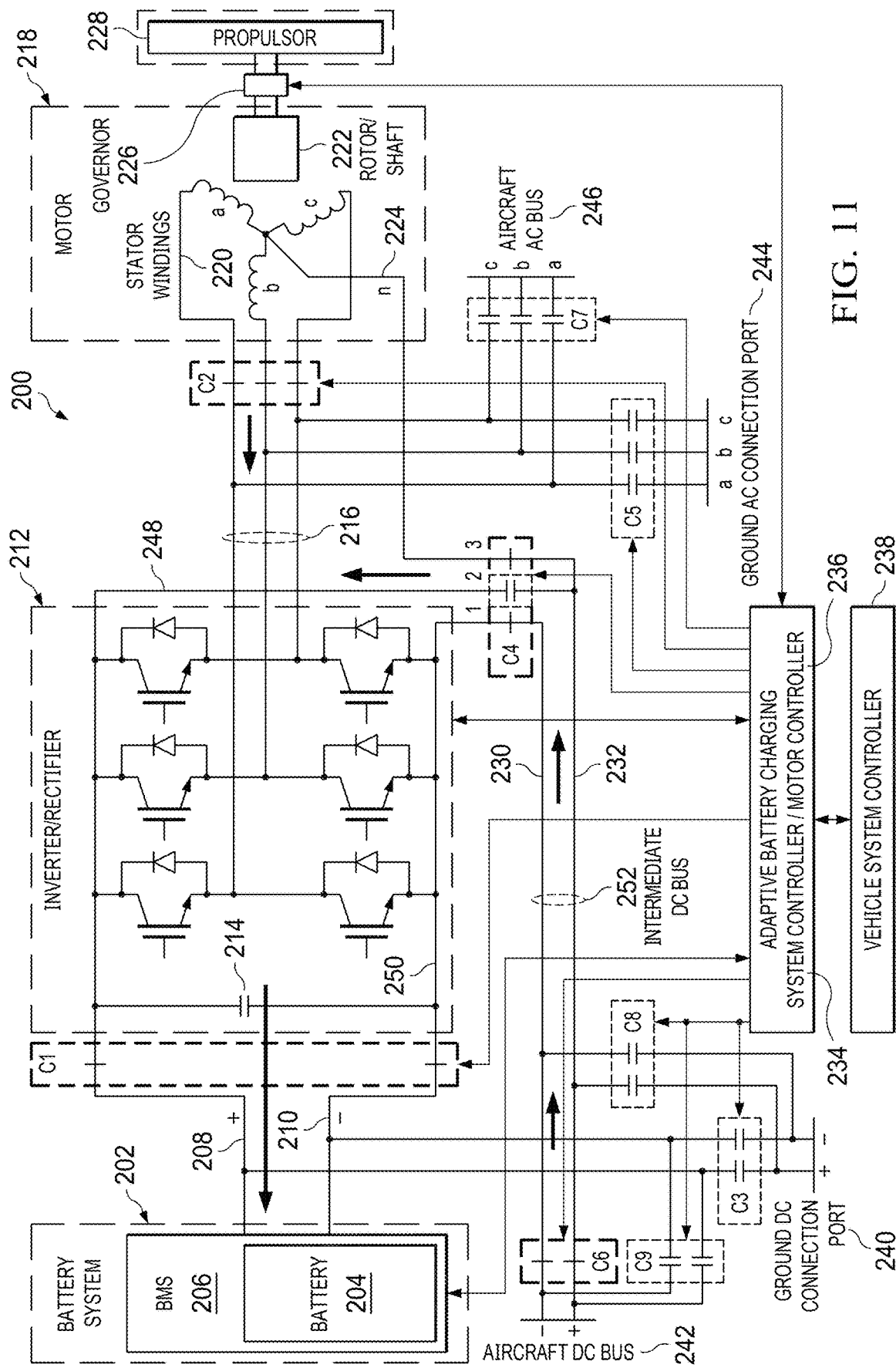
FIG. 11 depicts a circuit diagram illustrating aircraft DC boost charging of a battery in accordance with an illustrative embodiment.

FIG. 11 depicts a circuit diagram illustrating aircraft DC boost charging of a battery in accordance with an illustrative embodiment. FIG. 11 illustrates an example of applying process 900 in FIG. 9 to adaptive battery charging system 200 in FIG. 2.

The vehicle system controller 238 sends a command signal to the battery charging system controller 234 and motor controller 236. The battery charging system controller 234 and motor controller 236 are activated.

Controllable contactors C1, C2, C4-1, C4-3, and C6 are closed. Controllable contactor C1 connect the positive terminal 208 and negative terminal 210 to corresponding rails 248, 250 of bidirectional converter 212 on the DC input side. Controllable contactors C2 connect three-phase AC bus 216 to the three-phase input of AC motor 218. Controllable contactor C4-1 connects the negative rail 250 and of bidirectional converter 212 to the corresponding negative line 230 of intermediate DC bus 252. Controllable contactor C4-3 connects the AC motor neutral 224 to the positive line 232 of intermediate DC bus 252. Controllable contactors C6 connect aircraft DC power bus 242 to intermediate DC bus 252.

Controllable connectors C3, C4-2, C5, and C7-C9 are left open.

The battery 204 is controlled by the battery charging system controller 234 and BMS 206 to execute a constant-current then a constant-voltage charging algorithm or other algorithm depending on the specific battery. Power flows from the aircraft DC power bus 242 via the intermediate DC bus 252 to the neutral point 224 of the AC motor 218 and splits equally into three-phase winding DC currents. Stator windings 220 and the three-phase bidirectional converter 212 (working in inverter mode) form part of the charging system in an integrated fashion. The inductance the stator windings 220 is connected to the corresponding three-phase AC bus 216 of the bidirectional converter 212, forming a single-phase boost converter. By controlling the switches of the bidirectional converter 212, the voltage at the DC side of the converter is higher than the DC voltage of the ground DC power source 254, thereby achieving a boost charging effect.

BMS 206 monitors battery status and sends battery voltage and current signals to the battery charging system controller 234, which in turn controls the BMS 206 for safe, fast, and optimized charging.

When the battery 204 is fully charged, the battery charging system controller 234 send a control signal to open controllable contactors C1, C2, C4-1, C4-3, and C6 thereby disconnecting the battery system 202 from the aircraft DC power bus 242. The vehicle system controller 238 may interrupt and override the charging process due to an unexpected emergency situation.

Aircraft DC boost charging mode is suited to a situation wherein another DC source onboard has additional energy and the aircraft bus voltage level is lower than the battery designed voltage while the aircraft is airborne. In this mode, the bidirectional converter 212 may be used for interrupting the charging process to protect the battery in case of an unexpected emergency.

Figure 12:
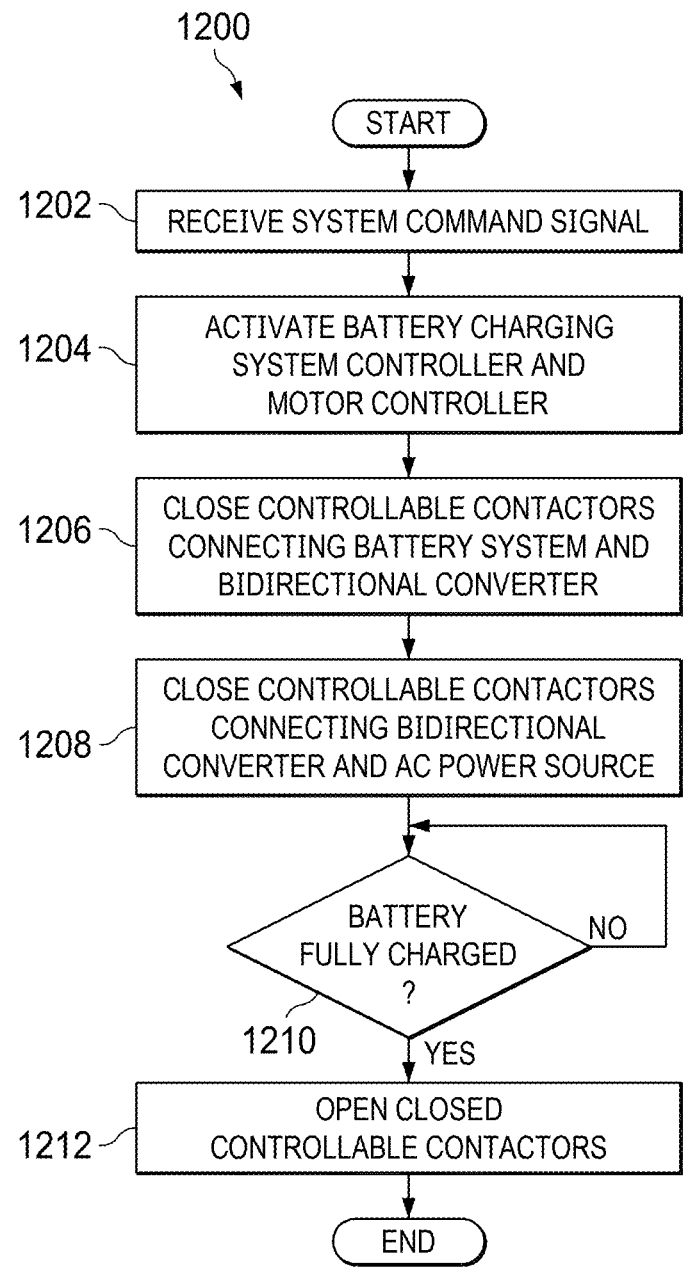
FIG. 12 depicts a flowchart illustrating a process for battery charging from an AC power source in accordance with an illustrative embodiment.

FIG. 12 depicts a flowchart illustrating a process for battery charging from an AC power source in accordance with an illustrative embodiment. Process 1200 may be implemented in adaptive battery charging system 100 in FIG. 1 and adaptive battery charging system 200 in FIG. 2.

Process 1200 begins with the adaptive battery charging system receiving a system command signal (operation 1202). Responsive to the system command signal, the vehicle system controller sends a signal to activate the battery charging system controller and motor controller (operation 1204).

The battery charging system controller sends a signal to close a first set of controllable contactors to allow electrical current between the battery system and the bidirectional converter (operation 1206).

The battery charging system controller also sends a signal to close a second set of controllable contactors to allow electrical current between the bidirectional converter and an AC power source (operation 1208). The intermediate AC power source may be a ground AC power source or an aircraft AC power bus.

The battery charging system controller continually monitors the battery charge level (operation 1210). Responsive to the aircraft battery reaching full charge the battery charging system controller sends a signal to open the closed controllable contactors to disconnect the battery system from the AC power source (operation 1212). Process 1200 then ends.

Figure 13:
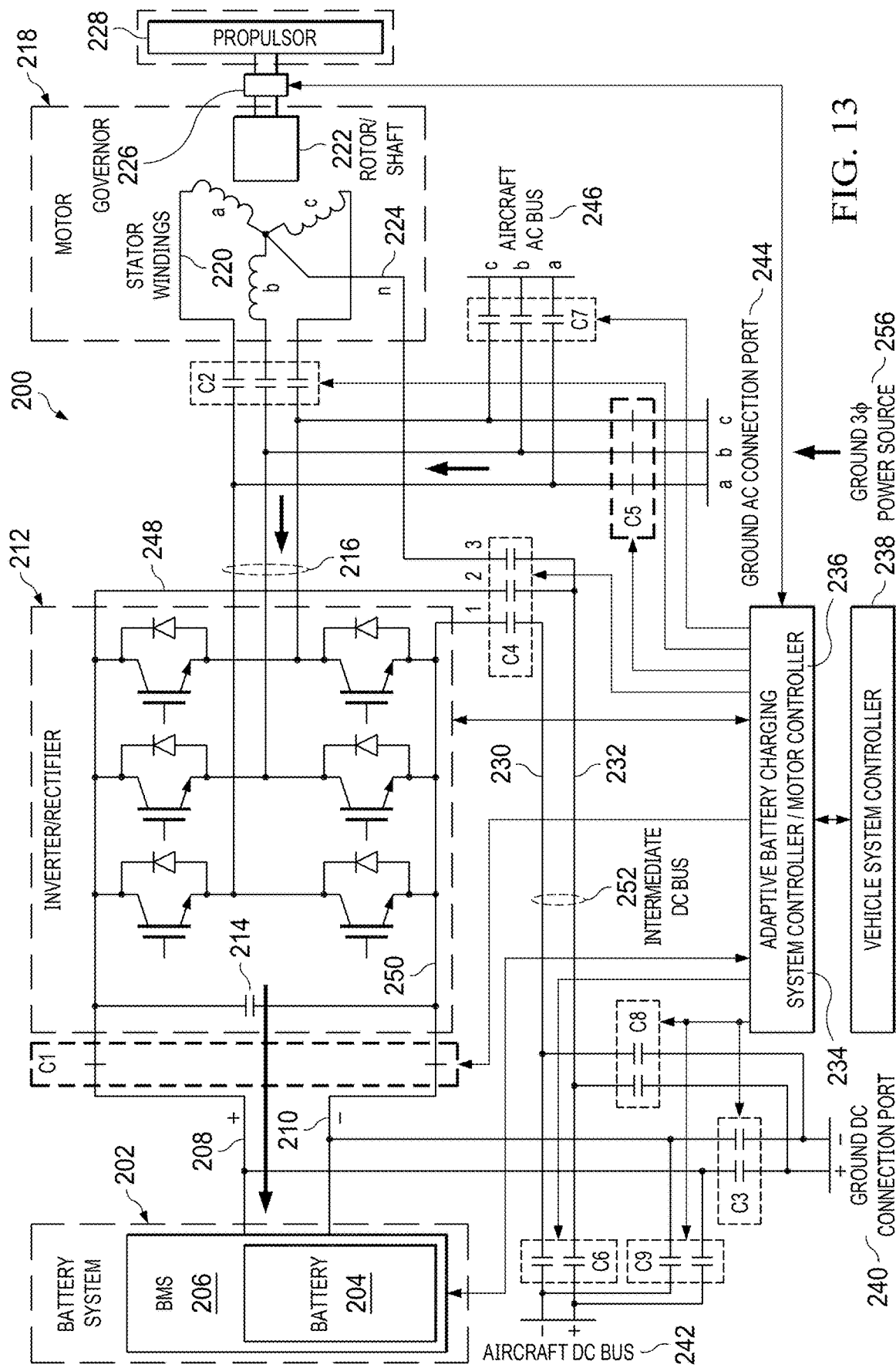
FIG. 13 depicts a circuit diagram illustrating ground three-phase AC charging of a battery in accordance with an illustrative embodiment.

FIG. 13 depicts a circuit diagram illustrating ground three-phase AC charging of a battery in accordance with an illustrative embodiment. FIG. 13 illustrates an example of applying process 1200 in FIG. 12 to adaptive battery charging system 200 in FIG. 2.

The vehicle system controller 238 sends a command signal to the battery charging system controller 234 and motor controller 236. The battery charging system controller 234 and motor controller 236 are activated.

Controllable contactors C1 and C5 are closed. Controllable contactors C1 connect the positive terminal 208 and negative terminal 210 to corresponding rails 248, 250 of bidirectional converter 212 on the DC input side. Controllable contactors C5 connect the three-phase AC bus 216 of bidirectional converter 212 to three-phase inputs of ground AC connection port 244, which is connected to three-phase AC power source 256.

Controllable connectors C2, C3, C4, C6, and C7-C9 are left open, isolating the AC motor 218 and propulsor 228 from the charging process.

The battery 204 is controlled by the battery charging system controller 234 and BMS 206 to execute a constant-current then a constant-voltage charging algorithm or other algorithm depending on the specific battery. Bidirectional converter 212 is controlled by battery charging system controller 234 and motor controller 236 for rectification mode by applying a control algorithm as power flows from AC to DC. BMS 206 monitors battery status and sends battery voltage and current signals to the battery charging system controller 234, which in turn controls the BMS 206 for safe, fast, and optimized charging.

When the battery 204 is fully charged, the battery charging system controller 234 send a control signal to open controllable contactors C1 and C5, thereby disconnecting the battery system 202 from the ground three-phase AC power source 256. The vehicle system controller 238 may interrupt and override the charging process due to an unexpected emergency situation.

Ground three-phase AC charging mode is suited to a situation wherein a ground facility only has a three-phase AC power source. In this mode, the bidirectional converter 212 may be used for interrupting the charging process to protect the battery in case of an unexpected emergency.

Figure 14:
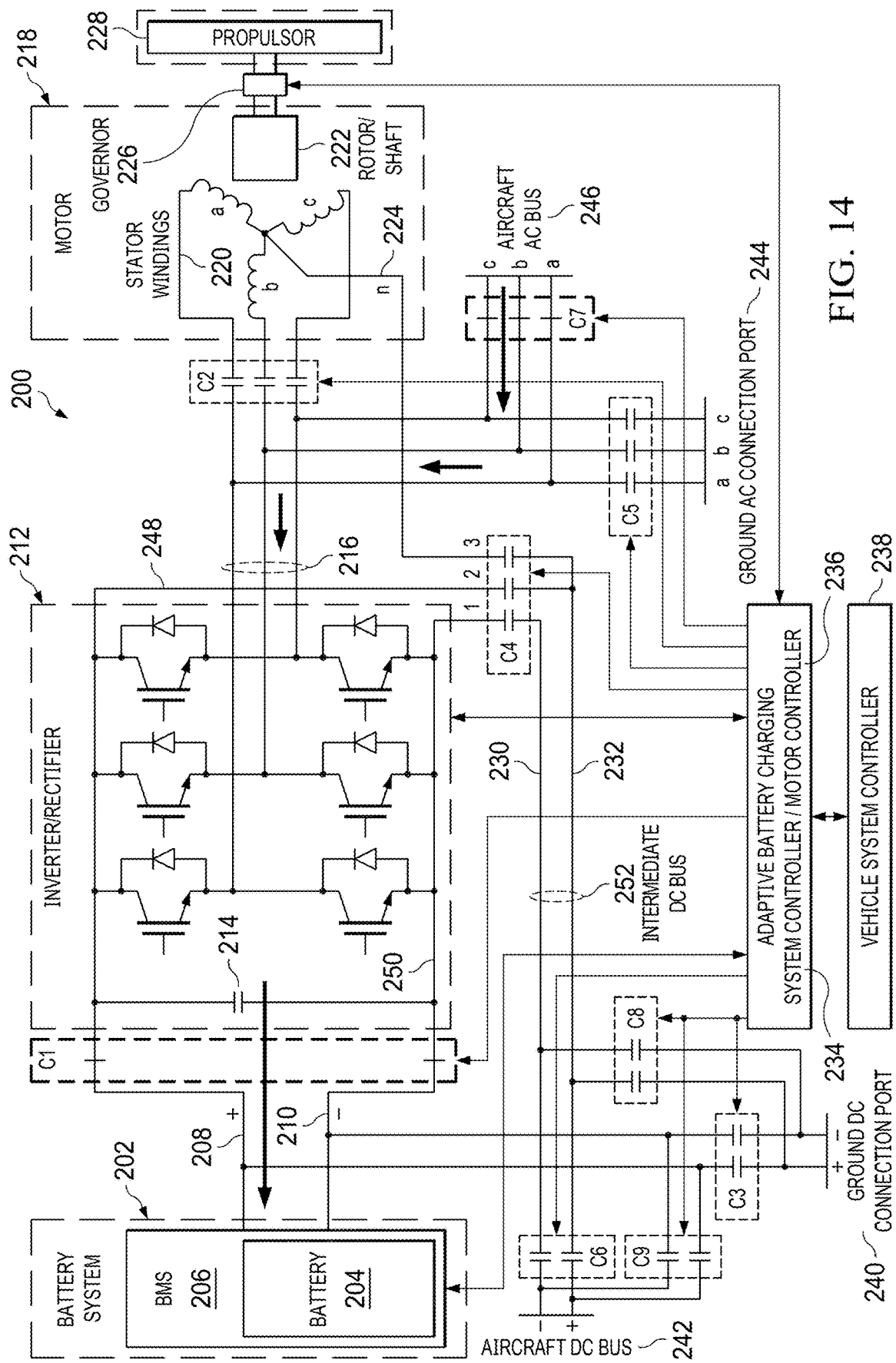
FIG. 14 depicts a circuit diagram illustrating aircraft three-phase AC charging of a battery in accordance with an illustrative embodiment.

FIG. 14 depicts a circuit diagram illustrating aircraft three-phase AC charging of a battery in accordance with an illustrative embodiment. FIG. 14 illustrates an example of applying process 1200 in FIG. 12 to adaptive battery charging system 200 in FIG. 2.

The vehicle system controller 238 sends a command signal to the battery charging system controller 234 and motor controller 236. The battery charging system controller 234 and motor controller 236 are activated.

Controllable contactors C1 and C7 are closed. Controllable contactors C1 connect the positive terminal 208 and negative terminal 210 to corresponding rails 248, 250 of bidirectional converter 212 on the DC input side. Controllable contactors C7 connect the three-phase AC bus 216 of bidirectional converter 212 to three-phase inputs of aircraft three-phase AC power bus 246.

Controllable connectors C2-C6 and C8-C9 are left open, isolating the AC motor 218 and propulsor 228 from the charging process.

The battery 204 is controlled by the battery charging system controller 234 and BMS 206 to execute a constant-current then a constant-voltage charging algorithm or other algorithm depending on the specific battery. Bidirectional converter 212 is controlled by battery charging system controller 234 and motor controller 236 for rectification mode by applying a control algorithm as power flows from AC to DC. BMS 206 monitors battery status and sends battery voltage and current signals to the battery charging system controller 234, which in turn controls the BMS 206 for safe, fast, and optimized charging.

When the battery 204 is fully charged, the battery charging system controller 234 send a control signal to open controllable contactors C1 and C7, thereby disconnecting the battery system 202 from the aircraft three-phase AC power bus 246. The vehicle system controller 238 may interrupt and override the charging process due to an unexpected emergency situation.

In this mode, the bidirectional converter 212 may be used for interrupting the charging process to protect the battery in case of an unexpected emergency.

Figure 15:
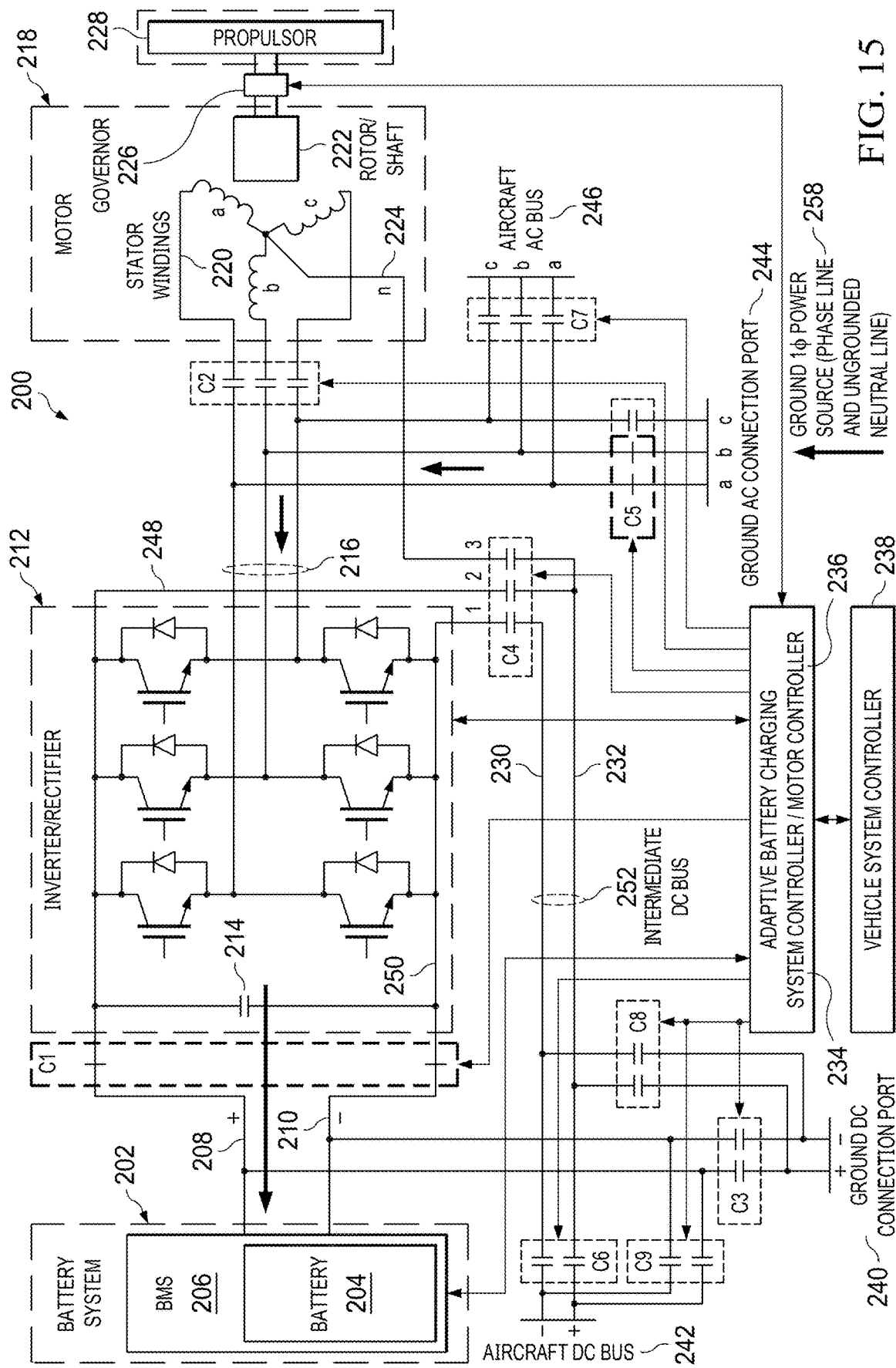
FIG. 15 depicts a circuit diagram illustrating ground one-phase AC charging of a battery in accordance with an illustrative embodiment.

FIG. 15 depicts a circuit diagram illustrating ground one-phase AC charging of a battery in accordance with an illustrative embodiment. FIG. 15 illustrates an example of applying process 1200 in FIG. 12 to adaptive battery charging system 200 in FIG. 2.

The vehicle system controller 238 sends a command signal to the battery charging system controller 234 and motor controller 236. The battery charging system controller 234 and motor controller 236 are activated.

Controllable contactors C1, C5-a, and C5-b are closed. Alternatively, a combination of controllable contactors C5-b/C5-c or C5-c/C5-a may also be closed. Controllable contactors C1 connect the positive terminal 208 and negative terminal 210 to corresponding rails 248, 250 of bidirectional converter 212 on the DC input side. Controllable contactors C5-a and C5-b connect phase a and b outputs of three-phase AC bus 216 to the phase and ungrounded neutral inputs of ground one-phase AC power source 258 through ground AC connection port 244.

Controllable connectors C2, C3, C4, C5-c, C6, and C7-C9 are left open, isolating the AC motor 218 and propulsor 228 from the charging process.

The battery 204 is controlled by the battery charging system controller 234 and BMS 206 to execute a constant-current then a constant-voltage charging algorithm or other algorithm depending on the specific battery. Bidirectional converter 212 is controlled by battery charging system controller 234 and motor controller 236 for rectification mode by applying a control algorithm as power flows from AC to DC. BMS 206 monitors battery status and sends battery voltage and current signals to the battery charging system controller 234, which in turn controls the BMS 206 for safe, fast, and optimized charging.

When the battery 204 is fully charged, the battery charging system controller 234 send a control signal to open controllable contactors C1, C5-a, and C5-b thereby disconnecting the battery system 202 from the ground one-phase AC power source 258. The vehicle system controller 238 may interrupt and override the charging process due to an unexpected emergency situation.

Ground one-phase AC charging mode is suited to a situation wherein a ground facility only has a one-phase AC power source. In this mode, the bidirectional converter 212 may be used for interrupting the charging process to protect the battery in case of an unexpected emergency.

Figure 16:
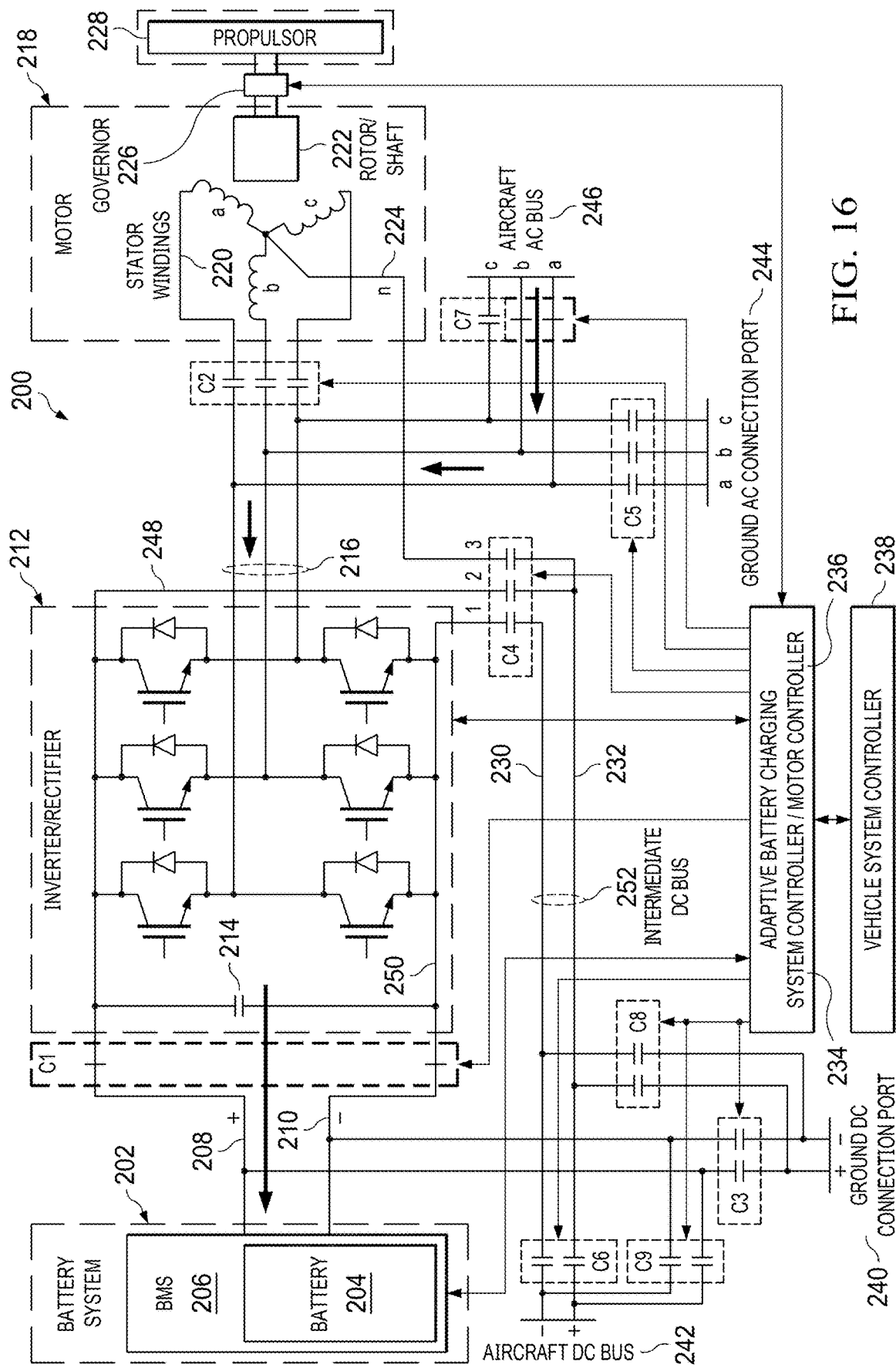
FIG. 16 depicts a circuit diagram illustrating aircraft one-phase AC charging of a battery in accordance with an illustrative embodiment.

FIG. 16 depicts a circuit diagram illustrating aircraft one-phase AC charging of a battery in accordance with an illustrative embodiment. FIG. 16 illustrates an example of applying process 1200 in FIG. 12 to adaptive battery charging system 200 in FIG. 2.

The vehicle system controller 238 sends a command signal to the battery charging system controller 234 and motor controller 236. The battery charging system controller 234 and motor controller 236 are activated.

Controllable contactors C1, C7-a, and C7-b are closed. Alternatively, a combination of controllable contactors C7-b/C7-c or C7-c/C7-a may also be closed. Controllable contactors C1 connect the positive terminal 208 and negative terminal 210 to corresponding rails 248, 250 of bidirectional converter 212 on the DC input side. Controllable contactors C7-a and C7-b connect phase a and b outputs of three-phase AC bus 216 to the phase and ungrounded neutral inputs of aircraft one-phase AC power bus 260.

Controllable connectors C2-C6, C7-claim, and C8-C9 are left open, isolating the AC motor 218 and propulsor 228 from the charging process.

The battery 204 is controlled by the battery charging system controller 234 and BMS 206 to execute a constant-current then a constant-voltage charging algorithm or other algorithm depending on the specific battery. Bidirectional converter 212 is controlled by battery charging system controller 234 and motor controller 236 for rectification mode by applying a control algorithm as power flows from AC to DC. BMS 206 monitors battery status and sends battery voltage and current signals to the battery charging system controller 234, which in turn controls the BMS 206 for safe, fast, and optimized charging.

When the battery 204 is fully charged, the battery charging system controller 234 send a control signal to open controllable contactors C1, C7-a, and C7-b thereby disconnecting the battery system 202 from the aircraft one-phase AC power bus 260. The vehicle system controller 238 may interrupt and override the charging process due to an unexpected emergency situation.

Aircraft one-phase AC charging mode is suited to a situation wherein the aircraft has a one-phase AC power bus that is of extra power to surplus. This situation may occur when a generator has a single-phase load which causes phase imbalance. Using the extra to charge the battery can result in a better phase balance condition to extend the generator life while effectively using the energy to charge the battery. In this mode, the bidirectional converter 212 may be used for interrupting the charging process to protect the battery in case of an unexpected emergency.

Figure 17:
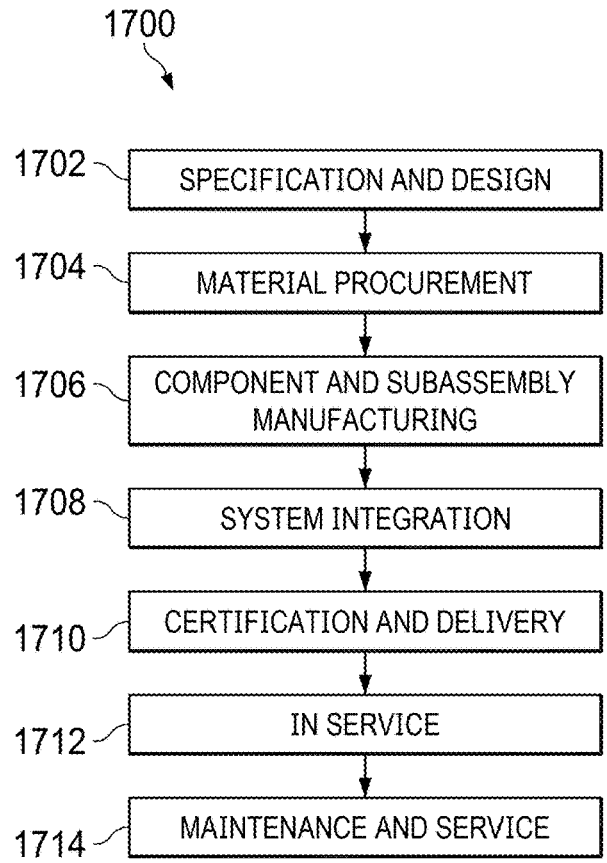
FIG. 17 is an illustration of a block diagram of an aircraft manufacturing and service method in accordance with an illustrative embodiment.
Figure 18:
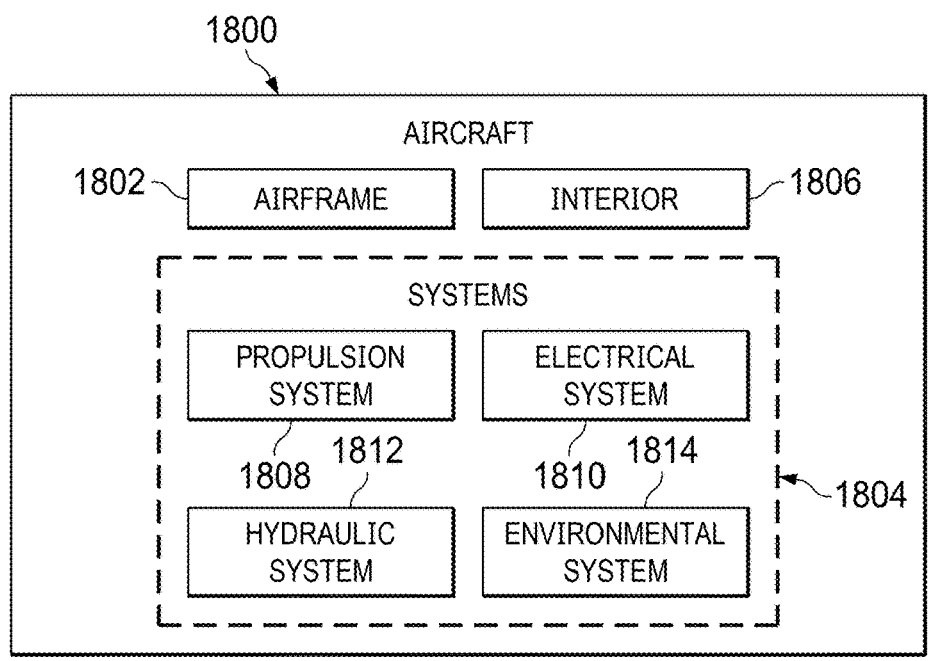
FIG. 18 is an illustration of a block diagram of an aircraft in which an illustrative embodiment may be implemented.

Illustrative embodiments of the disclosure may be described in the context of aircraft manufacturing and service method 1700 as shown in FIG. 17 and aircraft 1800 as shown in FIG. 18. Turning first to FIG. 17, an illustration of an aircraft manufacturing and service method is depicted in accordance with an illustrative embodiment. During preproduction, aircraft manufacturing and service method 1700 may include specification and design 1702 of aircraft 1800 in FIG. 18 and material procurement 1704.

During production, component and subassembly manufacturing 1706 and system integration 1708 of aircraft 1800 in FIG. 18 takes place. Thereafter, aircraft 1800 in FIG. 18 can go through certification and delivery 1710 in order to be placed in service 1712. While in service 1712 by a customer, aircraft 1800 in FIG. 18 is scheduled for routine maintenance and service 1714, which may include modification, reconfiguration, refurbishment, and other maintenance or service.

Each of the processes of aircraft manufacturing and service method 1700 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of an aircraft is depicted in which an illustrative embodiment may be implemented. In this example, aircraft 1800 is produced by aircraft manufacturing and service method 1700 in FIG. 17 and may include airframe 1802 with plurality of systems 1804 and interior 1806. Examples of systems 1804 include one or more of propulsion system 1808, electrical system 1810, hydraulic system 1812, and environmental system 1814. Any number of other systems may be included. An adaptive battery charging system 100/200 as described in the foregoing examples above can be located in electrical system 810. Although an aerospace example is shown, different illustrative embodiments may be applied to other industries, such as the automotive industry.

Apparatuses and methods embodied herein may be employed during at least one of the stages of aircraft manufacturing and service method 1700 in FIG. 17. In one illustrative example, components or subassemblies produced in component and subassembly manufacturing 1706 in FIG. 17 can be fabricated or manufactured in a manner similar to components or subassemblies produced while aircraft 1800 is in service 1712 in FIG. 17. As yet another example, one or more apparatus embodiments, method embodiments, or a combination thereof can be utilized during production stages, such as component and subassembly manufacturing 1706 and system integration 1708 in FIG. 17. An adaptive battery charging system can be manufactured during component and subassembly manufacture 1706 and integrated into aircraft 1800 during system integration 1708. One or more apparatus embodiments, method embodiments, or a combination thereof may be utilized while aircraft 1800 is in service 1712, during maintenance and service 1714 in FIG. 17, or both. An aircraft adaptive battery charging system as described in different illustrative examples can operate at least one of in service 1712 or maintenance and service 1714. Further, an aircraft adaptive battery charging system can be added to aircraft 1800 during maintenance and service 1714 as part of modification, reconfiguration, refurbishment, and other maintenance or service. The use of a number of the different illustrative embodiments may substantially expedite the assembly of aircraft 1800, reduce the cost of aircraft 1800, or both expedite the assembly of aircraft 1800 and reduce the cost of aircraft 1800.

As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft adaptive battery charging system that comprises:
   a battery system;
   a bidirectional converter, wherein the bidirectional converter comprises an inverter mode and a rectifier mode;
   an alternating current (AC) motor;
   a number of controllable contactors that control electrical current between the battery system, bidirectional converter, AC motor, and a power source, wherein the controllable contactors comprise a closed position that allows electrical current flow and an open position that prevents electrical current flow;
   a motor controller;
   a battery charging system controller configured to send control signals to the battery system, motor controller, and controllable contactors in response to system command signals; and
   a vehicle system controller that sends system command signals to the motor controller and battery charging system controller.

2. The aircraft adaptive battery charging system of claim 1, wherein the controllable contactors further comprise:
   a first set of controllable contactors that connect the battery system and bidirectional converter;
   a second set of controllable contactors that connect the AC motor to the bidirectional converter;
   a third set of controllable contactors that connect the battery system to an intermediate direct current (DC) bus;
   a fourth set of controllable contactors that connect the bidirectional converter and the AC motor to the intermediate DC bus;
   a fifth set of controllable contactors that connect output terminals of the bidirectional converter to a ground AC connection port;
   a sixth set of controllable contactors that connects the intermediate DC bus to an aircraft DC bus; and
   a seventh set of controllable contactors that connect the output terminals of the bidirectional converter to an aircraft AC bus.

3. The aircraft adaptive battery charging system of claim 1, further comprising:
   a propulsor mounted on a shaft extending from the AC motor; and
   a governor subsystem that senses shaft speed and propulsor blade pitch angle and controls propulsor blade pitch angle responsive to commands from the motor controller.

4. The aircraft adaptive battery charging system of claim 1, wherein the AC motor is a three-phase, four-wire AC motor comprising:
   a set of three-phase stator windings connected to a three-phase AC bus;
   a neutral wire connected to an intermediate DC bus via a controllable contactor; and
   a rotor/shaft assembly.

5. The aircraft adaptive battery charging system of claim 1, wherein the battery system comprises:
   a battery; and
   a battery management system comprising positive and negative terminals to deliver electrical power from the battery to a bus or receive electrical power from the bus to charge the battery.

6. The aircraft adaptive battery charging system of claim 1, wherein the bidirectional converter is a three-phase bidirectional converter comprising a multi-level inverter with a DC filter.

7. The aircraft adaptive battery charging system of claim 1, wherein the power source comprises:
   an aircraft power bus; or
   a ground power source.

8. A method for charging an aircraft battery, the method comprising:
   receiving, by an adaptive battery charging system, a system command signal, wherein the adaptive battery charging system comprises:
      a battery system including the aircraft battery;
      a battery charging system controller; and
      a vehicle system controller that sends the system command signal to the battery charging system controller;
   responsive to the system command signal:
      sending, by the vehicle system controller, a signal to activate the battery charging system controller;
      sending, by the battery charging system controller, a signal to close a first set of controllable contactors to allow electrical current between the battery system and an intermediate direct current (DC) bus, wherein the intermediate DC bus is connected to a DC power source; and
      responsive to the aircraft battery reaching full charge, sending, by the battery charging system controller, a signal to open closed controllable contactors.

9. The method of claim 8, wherein the DC power source is a ground DC power source.

10. The method of claim 8, wherein the DC power source is an aircraft DC power bus, and wherein the battery charging system controller sends a signal to close a second set of controllable contactors to allow electrical current between the aircraft DC power bus and the intermediate DC bus.

11. A method for charging an aircraft battery, the method comprising:
   receiving, by an adaptive battery charging system, a system command signal, wherein the adaptive battery charging system comprises:
      a battery system including the aircraft battery;
      a bidirectional converter;
      a motor controller;
      a battery charging system controller; and
      a vehicle system controller that sends the system command signal to the motor controller and the battery charging system controller;
   responsive to the system command signal:
      sending, by the vehicle system controller, a signal to activate the battery charging system controller and motor controller;
      sending, by the battery charging system controller, a signal to close a first set of controllable contactors to allow electrical current between the battery system and the bidirectional converter;
      sending, by the battery charging system controller, a signal to close a second set of controllable contactors to allow electrical current between the bidirectional converter and an intermediate direct current (DC) bus, wherein the intermediate DC bus is connected to a DC power source; and responsive to the aircraft battery reaching full charge, sending, by the battery charging system controller, a signal to open closed controllable contactors.

12. The method of claim 11, wherein the DC power source is a ground DC power source.

13. The method of claim 11, wherein the DC power source is an aircraft DC power bus, and wherein the battery charging system controller sends a signal to close a third set of controllable contactors to allow electrical current between the aircraft DC power bus and the intermediate DC bus.

14. The method of claim 11, wherein, responsive to detection of a specified emergency condition, the bidirectional converter interrupts battery charging.

15. A method for charging an aircraft battery, the method comprising:

receiving, by an adaptive battery charging system, a system command signal, wherein the adaptive battery charging system comprises:
   a battery system including the aircraft battery;
   a bidirectional converter;
   an alternating current (AC) motor;
   a motor controller;
   a battery charging system controller; and
   a vehicle system controller that sends the system command signal to the motor controller and the battery charging system controller;

responsive to the system command signal:
   sending, by the vehicle system controller, a signal to activate the battery charging system controller and motor controller;
   sending, by the battery charging system controller, a signal to close a first set of controllable contactors to allow electrical current between the battery system and the bidirectional converter;
   sending, by the battery charging system controller, a signal to close a second set of controllable contactors to allow electrical current between the bidirectional converter and the AC motor;
   sending, by the battery charging system controller, a signal to close a third set of controllable contactors to allow electrical current between an intermediate direct current (DC) bus and both the bidirectional converter and AC motor, wherein the intermediate DC bus is connected to a DC power source; and
   responsive to the aircraft battery reaching full charge, sending, by the battery charging system controller, a signal to open closed controllable contactors.

16. The method of claim 15, wherein the DC power source is a ground DC power source.

17. The method of claim 15, wherein the DC power source is an aircraft DC power bus, and wherein the battery charging system controller sends a signal to close a fourth set of controllable contactors to allow electrical current between the aircraft DC power bus and the intermediate DC bus.

18. The method of claim 15, wherein, responsive to detection of a specified emergency condition, the bidirectional converter interrupts battery charging.

19. A method for charging an aircraft battery, the method comprising:

receiving, by an adaptive battery charging system, a system command signal, wherein the adaptive battery charging system comprises:
   a battery system including the aircraft battery;
   a bidirectional converter;
   a motor controller;
   a battery charging system controller; and
   a vehicle system controller that sends the system command signal to the motor controller and the battery charging system controller;

responsive to the system command signal:
   sending, by the vehicle system controller, a signal to activate the battery charging system controller and motor controller;
   sending, by the battery charging system controller, a signal to close a first set of controllable contactors to allow electrical current between the battery system and the bidirectional converter;
   sending, by the battery charging system controller, a signal to close a second set of controllable contactors to allow electrical current between the bidirectional converter and an alternating current (AC) power source; and
   responsive to the aircraft battery reaching full charge, sending, by the battery charging system controller, a signal to open closed controllable contactors.

20. The method of claim 19, wherein the AC power source is a ground AC power source.

21. The method of claim 20, wherein the ground AC power source is a ground three-phase AC power source, wherein the second set of controllable contactors connect three-phase outputs of the bidirectional converter to three-phase inputs of the ground three-phase AC power source.

22. The method of claim 20, wherein the ground AC power source is a ground one-phase AC power source, wherein the second set of controllable contactors connect phase a and b outputs of the bidirectional converter to a phase input and ungrounded neutral input of the ground one-phase AC power source.

23. The method of claim 19, wherein the AC power source is an aircraft AC power bus.

24. The method of claim 23, wherein the aircraft AC power bus is an aircraft three-phase AC power bus, wherein the second set of controllable contactors connect three-phase outputs of the bidirectional converter to three-phase inputs of the aircraft three-phase AC power bus.

25. The method of claim 23, wherein the aircraft AC power bus is an aircraft one-phase AC power bus, wherein the second set of controllable contactors connect phase a and b outputs of the bidirectional converter to a phase input and ungrounded neutral input of the aircraft one-phase AC power bus.

26. The method of claim 19, wherein, responsive to detection of a specified emergency condition, the bidirectional converter interrupts battery charging.

* * * * *